US010824568B2

(12) United States Patent
Benisty et al.

(10) Patent No.: US 10,824,568 B2
(45) Date of Patent: Nov. 3, 2020

(54) SPECULATIVE PRE-FETCHING OF FLASH TRANSLATION LAYER TABLES FOR USE WITH SOLID STATE SYSTEMS

(71) Applicant: Western Digital Technologies, Inc., San Jose, CA (US)

(72) Inventors: Shay Benisty, Beer Sheva (IL); Leonid Minz, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 104 days.

(21) Appl. No.: 16/045,350

(22) Filed: Jul. 25, 2018

(65) Prior Publication Data
US 2020/0034298 A1    Jan. 30, 2020

(51) Int. Cl.
| | | |
|---|---|---|
| G06F 12/0862 | (2016.01) | |
| G06F 12/02 | (2006.01) | |
| G06F 12/1009 | (2016.01) | |
| G06F 12/0873 | (2016.01) | |
| G06F 12/06 | (2006.01) | |
| G06F 12/0871 | (2016.01) | |

(52) U.S. Cl.
CPC ...... *G06F 12/0862* (2013.01); *G06F 12/0246* (2013.01); *G06F 12/0646* (2013.01); *G06F 12/0871* (2013.01); *G06F 12/0873* (2013.01); *G06F 12/1009* (2013.01); *G06F 2212/507* (2013.01); *G06F 2212/608* (2013.01); *G06F 2212/7201* (2013.01)

(58) Field of Classification Search
CPC ............. G06F 12/00–16; G06F 2212/72–7211
See application file for complete search history.

(56) References Cited

U.S. PATENT DOCUMENTS

| | | | |
|---|---|---|---|
| 2010/0023800 A1* | 1/2010 | Harari ................. | G06F 11/1068 714/2 |
| 2015/0186068 A1* | 7/2015 | Benisty ................ | G06F 3/0673 711/154 |

(Continued)

OTHER PUBLICATIONS

NVM Express; "Non-Volatile Memory Express" Revision 1.3a, dated Oct. 24, 2017; 287 pages.

*Primary Examiner* — Nicholas J Simonetti
(74) *Attorney, Agent, or Firm* — Loza & Loza, LLP; Gabriel Fitch

(57) ABSTRACT

The present disclosure describes technologies and techniques for use by a data storage controller of a non-volatile memory (NVM) system. In various examples, the controller is configured to perform speculative pre-fetching from a flash translation layer (FTL) table that relates logical addresses to physical locations in the NVM. In some examples, hardware within the controller fetches an entry from an external FTL table based on a provisional FTL address determined using a simplified (quick) address determination procedure and caches the entry internally. This is referred to as speculative pre-fetch. An FTL processor also determines the address of the FTL entry using a full (slower) firmware-based procedure. The FTL processor applies its firmware-computed address to the cache to determine if the entry is cached and, if so, the entry is retrieved from the cache. Otherwise, the entry is retrieved from the external FTL table. In this manner, latency can be reduced.

30 Claims, 18 Drawing Sheets

(56) References Cited

U.S. PATENT DOCUMENTS

| | | | |
|---|---|---|---|
| 2016/0246726 A1* | 8/2016 | Hahn | G06F 12/0862 |
| 2017/0024326 A1* | 1/2017 | Luo | G06F 12/0891 |
| 2017/0285940 A1 | 10/2017 | Benisty et al. | |
| 2018/0239714 A1* | 8/2018 | Abhishek Raja | G06F 12/1027 |

* cited by examiner

*Further Exemplary operations for use by an NVM Data Storage System*

1500

1502 — Input a host command such as a read, program or erase command (via, e.g., a submission queue) and extract an LBA from the command that corresponds to a particular NVM physical address

1504 — Using the LBA and a simplified (or non-simplified) HW-based FTL procedure, determine a provisional FTL table address for accessing a DRAM FTL table, where the provisional FTL address specifies a location of an entry within the FTL table that is not necessarily correct and does not necessarily correspond to the particular FTL table entry that maps the input LBA to the corresponding NVM physical address

1506 — Fetch the FTL table entry from the FTL table that corresponds to the provisional FTL table address and cache the fetched entry in an SRAM cache within the data storage controller

1508 — Using the same input host LBA and a full FW-based procedure, determine the correct FTL table address that corresponds to the particular FTL table entry that maps the input logical address to the corresponding NVM physical address, the FW-based procedure including one or more processing conditions that the simplified HW-based procedure omits, such as corner and edge cases

1510 — Access the SRAM cache (while enforcing cache coherency conditions) to determine if the FTL entry corresponding to the correct FTL table address value is within the cache and, if so, fetch the entry from the cache, and, if not, fetch the entry from the DRAM FTL table using the correct FTL address to locate the entry

1512 — Determine the physical address within the NVM device that corresponds to the input host LBA from the correct FTL table entry and access the NVM device at that physical address to execute the command and read, write (program) or erase data

1514 — Report completion of the command to the host (via, e.g., a completion queue) and forward any data read from the NVM device

FIG. 15

SPECULATIVE PRE-FETCHING OF FLASH TRANSLATION LAYER TABLES FOR USE WITH SOLID STATE SYSTEMS

FIELD

The subject matter described herein relates to data storage devices and controllers. More particularly, the subject matter relates, in some examples, to flash translation layer (FTL) tables and related caches for use with non-volatile memory (NVM) devices.

INTRODUCTION

Solid state drives (SSDs) such as flash drive data storage systems often utilize a non-volatile memory (NVM) composed of NAND storage components (herein-after "NANDs") that are accessed by a data storage controller. Such systems may exploit a flash translation layer (FTL) table or similar mapping component that provides information to map host logical block addresses to physical addresses within the NVM. In high-performance products such as client and enterprise SSDs, a cache of the FTL table may be provided to reduce FTL access latency. However, significant latency issues can still arise within SSDs that employ such caches, and it would be desirable to provide solutions to these and other issues.

SUMMARY

One embodiment of the present disclosure provides a data storage system for use with a host device including: a non-volatile memory (NVM) device, a cache, and a data storage controller. The data storage controller includes a processing system configured to: apply an input logical address to a first determination component to convert the input logical address to a first value for accessing a mapping component that maps logical addresses to corresponding NVM physical addresses in the NVM device; retrieve an entry from the mapping component that corresponds to the first value and caching the fetched entry in the cache; apply the input logical address to a second determination component to convert the input logical address to a second value for accessing the mapping component; and access the cache to determine if an entry corresponding to the second value is within the cache and, if so, fetching the entry from the cache, and, if not, fetching the entry from the mapping component using the second value to locate the entry within the mapping component.

Another embodiment of the present disclosure provides a data storage controller for use with an NVM device. The data storage controller includes: a first determination component configured to determine a first value from an input logical address for accessing a mapping component, the mapping component configured to map logical addresses to NVM physical addresses in the NVM device; a second determination component configured to determine a second value from the input logical address for accessing the mapping component; a cache controller configured to fetch an entry from the mapping component that corresponds to the first value and cache the fetched entry in a cache; and a processor configured to access the cache to determine if an entry corresponding to the second value is within the cache and, if so, to obtain the entry from the cache, and, if not, to obtain the entry from the mapping component using the second value.

Yet another embodiment of the present disclosure provides a method for use by a data storage system having a data storage controller and an NVM device. The method includes: determining, using an input logical address and a first determination procedure, a first value for accessing a mapping component that maps logical addresses to corresponding NVM physical addresses in the NVM device; fetching an entry from the mapping component that corresponds to the first value and caching the fetched entry in a cache; determining, using the input logical address and a second determination procedure, a second value for accessing the mapping component; and accessing the cache to determine if an entry corresponding to the second value is within the cache and, if so, fetching the entry from the cache, and, if not, fetching the entry from the mapping component using the second value to locate the entry within the mapping component.

Still yet another embodiment of the present disclosure provides an apparatus for use in a data storage system, including: means for means for converting an input logical address using a first conversion procedure to a first value for accessing a mapping component that maps logical addresses to corresponding NVM physical addresses in the NVM device; means for obtaining an entry from the mapping component that corresponds to the first value; means for caching the fetched entry in a cache; means for converting the input logical address using a second conversion procedure to a second value for accessing the mapping component; and means for accessing the cache to determine if an entry corresponding to the second value is within the cache and, if so, for fetching the entry from the cache, and, if not, for fetching the entry from the mapping component using the second value to locate the entry within the mapping component.

BRIEF DESCRIPTION OF THE DRAWINGS

The subject matter described herein will now be explained with reference to the accompanying drawings of which:

FIG. 15 is a flow chart summarizing further selected operations of the data storage controller.

DETAILED DESCRIPTION

Figure 1:
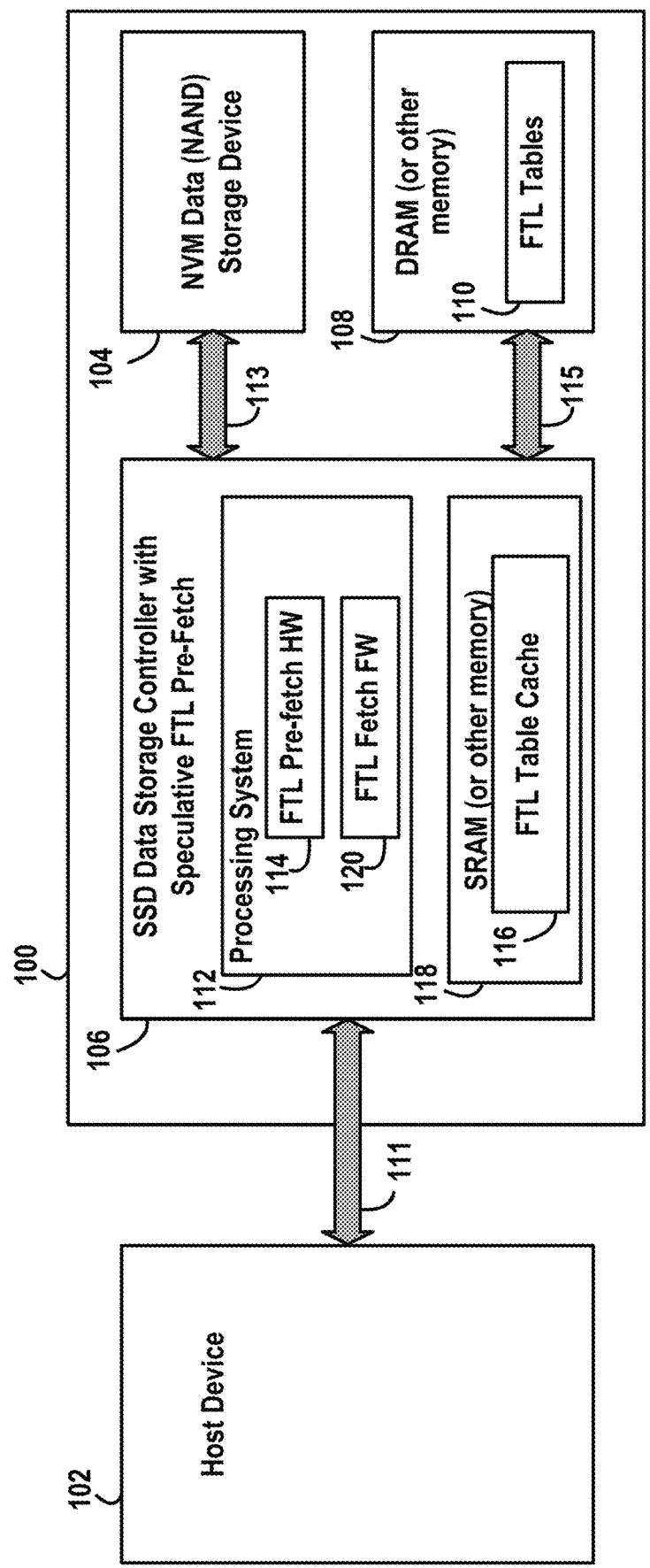
FIG. 1 illustrates a data storage system having a data storage controller and an NVM data storage device (such as a NAND), where the data storage controller is equipped for the speculative pre-fetching of flash translation layer (FTL) table entries.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.
Overview Aspects of the present disclosure provide various apparatus, devices, systems and methods for use by solid state drives (SSDs) or flash data storage systems. The main examples herein relate to removable non-volatile memory (NVM) storage systems configured for use with Peripheral Component Interconnect (PCI) Express-Non-Volatile Memory express (NVMe), wherein an NVM data storage controller (i.e. a device controller) is configured to control access by a host device to an NVM device such as a NAND storage element using NVMe protocols. See, for example, NVM Express standard, Revision 1.3a, Oct. 24, 2017. However, aspects described herein are applicable to other data storage systems or protocols.

As noted in the Introduction Section above, SSDs often utilize NAND storage components that are accessed by a data storage controller. Such NAND-based flash systems may employ a flash translation layer (FTL) or similar mapping component that includes FTL tables that provide information for mapping host logical block addresses (LBAs) to physical addresses in the NAND. The mapping of LBAs to physical addresses in the NAND can be complicated, and the FTL tables can be rather large. In some cases, two or more tables are employed. Locating a particular entry with the FTL table that corresponds to a particular host LBA can require some fairly complicated computations, which are often implemented in firmware (FW) rather than (HW) within the data storage controller. For instance, the LBA of a read command received from a host device may be applied to a FW component of an FTL processor to compute the address within the FTL table of the entry that stores the information needed to convert (e.g. map) the LBA to a physical address in the NAND. The FTL address is then used to access the FTL table to find the particular FTL entry, so that the mapping information then may be read out of the FTL by the FTL processor and used to determine the physical address in the NAND where the data to be read is currently stored.

In high-performance products, such as client and enterprise SSDs, the FTL table is stored in a dynamic random-access memory ("DRAM") device that is a separate component from the data storage controller. That is, the SSD may include a data storage controller, a NAND storage device, and a DRAM storage device, with the FTL tables maintained in the DRAM. In such devices, a typical ratio of DRAM consumed for FTL mapping tables to a total capacity of the memory system is 1:1000, i.e. 1 megabyte (MB) of table data is used to effectively address 1 gigabyte (GB) of NAND flash memory. Hence, a 240 GB device may need 240 MB of DRAM space for the FTL tables. DRAM access is relatively fast compared to NAND access. (A DRAM may be accessed on the order of a few μ-seconds per read, whereas a NAND flash memory access may require 50μ-secs per read, or more.) Nevertheless, the time required to compute the FTL address within the FTL table and then access the FTL table in DRAM can impose unwanted latency in the overall system, delaying response time to the host.

To reduce latency, a cache of the FTL tables of the external DRAM may be maintained in an internal static RAM (SRAM) of the data storage controller, or other relatively fast memory. Before accessing the FTL table in DRAM, the data storage controller first checks to determine if the relevant FTL entry is cached in the SRAM. If there is a cache hit, the entry can be retrieved from the SRAM, which is much quicker than accessing the DRAM. Hence, a few μSec can be saved if the FTL entry can be fetched from the cache rather than from the DRAM. However, in practical systems, there are often very few cache hits, especially for random reads, and so DRAM access time is not often saved. Worse, latency may even increase due to the need to access the cache first.

To summarize, in many SSDs equipped with a cache of a DRAM FTL table, to read data from the NAND of the SSD, the following operations are performed by the SSD:

Read command is received from a host device;
HW parses the read command to extract the logical address of the read;
HW queues the read command to FTL FW;
FTL FW computes the address of the relevant entry in FTL tables of the DRAM (using an LBA-to-FTL address determination procedure that is usually complex);
FTL FW (or DRAM HW) accesses the FTL cache to determine if the relevant entry is cached;

In most random read cases, the entry will not be cached, and so the FTL FW (or DRAM HW) then fetches the entry from FTL table stored in DRAM using the computed FTL address;

FTL FW converts the logical address to the physical address based on this entry; and FTL FW then fetches the data from the NAND based on the physical address, provides the data to the Host, and thus completes the command.

It would be desirable to reduce the latency caused by the many cache misses. To this end, in some examples described herein, to read data from an NVM in response to a host read command, HW within the date storage controller speculatively pre-fetches an entry from the FTL table stored in a DRAM (based on a provisional FTL table address calculated using a simplified HW-based procedure, discussed below). The pre-fetched entry is stored in a cache that is maintained in SRAM (or other fast memory) within the data storage controller. The HW concurrently queues the read command to FTL FW in parallel. The FTL FW processes the command and calculates the address of the relevant FTL table entry (using a full FW-based computation procedure, discussed below). Then, the FTL applies the FW-computed address to the SRAM cache to determine if the entry is cached therein. If the entry is cached, the entry is retrieved from the cache. Otherwise, the entry is retrieved from the DRAM.

The pre-fetching of the entry from the FTL table in DRAM based on the provisional address computed in HW using the simplified procedure is referred to herein as "speculative" because the controller is speculating that the provisional FTL address will be correct. Since the provisional FTL address is computed using a simplified procedure, the provisional FTL address might not be correct, and so the FTL entry stored in the cache might not be the needed FTL entry. Nevertheless, in many cases, the provisional FTL address will be correct, and so latency is reduced as compared to controllers that do not provide for speculative pre-fetching.

In this regard, the simplified address computation procedure performed by HW is much faster than the full computation procedure performed by FW and, hence, the HW computation is completed much sooner (relatively speaking) than the FW computation. And so the speculative pre-fetch can commence before the full FW computation procedure is complete. As such, by the time the full FW computation is done, the corresponding entry may already be stored in the cache in SRAM and can be promptly retrieved, thus reducing latency. Hence, among other features, the speculative pre-fetch addresses the issue of the few µSec required for fetching the relevant entry from FTL table and effectively "hides" that fetching even in a low queue depth. Hiding the few µSec can increase performance and quality of service, especially in low queue depth, e.g. a queue depth of one. Not only are those few µSec, hidden, but better internal pipeline performance and a HW/FW handshake can be achieved. In some scenarios, however, the HW does not store the entry in the cache until after the FTL processor accesses the cache (as might occur if the FTL processor is very fast and sends an FTL fetching request before the previous HW request has completed). In this case, cache coherency logic implemented in the DRAM controller, for example, may be provided to delay the second request until the previous request is completed. Then, the entry is read from cache. In this scenario, there may still be an operation benefit if part of the fetching operation was saved as part of the initial request.

Note that the simplified computation procedure may be the same as the full computation procedure but simplified to omit rare "edge cases" or "corner cases" in the address computation. Since simplified computation procedure omits those cases, it can be a much simpler procedure that is implemented in HW rather than in FW. However, since the simplified computation procedure omits the "edge cases" or "corner cases," it may not always be accurate. That is, as noted, the provisional FTL table address computed by HW using the simplified procedure might not be correct, and so the entry obtained from the DRAM during the speculative pre-fetch and cached in SRAM might not be the needed entry. If it is not the correct entry, there will be a cache miss when the FTL applies the FW-computed address to the cache.

However, in most practical scenarios, the entry obtained during the speculative pre-fetch will be the correct entry. That is, the initial simplified computation performed using HW will usually compute the FTL table address correctly and so the speculative pre-fetch caches the correct entry. Latency is thus reduced since the entry is obtained from the DRAM following relatively fast HW calculations performed using the simplified computation procedure (rather than waiting for the relatively slow FW computations to be completed), and that entry can now be promptly read from the SRAM cache. This can save a few µ-secs per read. And if a cache miss occurs (because the simplified HW computation was not correct), the FTL then retrieves the entry from the DRAM as it would otherwise have done if there were no pre-fetching. That is, if the speculative pre-fetch is successful, time is saved and latency is reduced. If it is not successful, the system is no worse off than if it had not done the speculative pre-fetch.

It is believed that, in practical SSD data read scenarios, there will be a cache hit in, e.g., 95% of the reads, often more, and so a significant reduction in latency can be achieved. This approach is expected to be especially effective in random read scenarios and in low queue depth. Even in other scenarios, the approach may serve to simplify the processing pipeline while providing better DRAM and cache efficiency. Although many of the examples herein employ a DRAM to store the FTL tables, the FTL tables may be stored in other components, and examples are described below where the tables are stored, e.g., in a host memory buffer (HMB) or in a second portion of NAND. Note, also, that speculative pre-fetching may be selectively applied to some commands and not others. For example, speculative pre-fetching may be enabled for host read and write commands, but not enabled for other commands (Note that, for NVM devices, write commands are often referred to as "program" commands.)

Thus, in some examples, speculative pre-fetch can provide improvements in:

1. Performance, as the performance of the controller of random read commands may be increased relative to other controllers since an internal pipeline of the controller may work more efficiently when DRAM pre-fetching and FW queuing is done in parallel.

2. Quality of Service, as the quality of service may be improved since, for example, in Queue Depth 1, the performance may be increased while hiding DRAM latency.

3. DRAM efficiency, as the interaction with the DRAM and usage of the cache can improve performance, since the cache hit/miss ratio may be significantly increased when using speculative pre-fetching (as compared to controllers that employ a cache but without speculative pre-fetching).

Improvements may be achieved especially in random read (RR) performance scenarios, both in low and high queue depth. For an example where the SSD workload uses RR commands with a device capacity of 1 terabyte (TB) while stressing the system thorough its full range, improvements of 20-50 kilo input/output operations per second (KIOPs) may be attained. Low queue depth may have a major impact. For a low queue depth, instead of having, e.g., a 2 µSec for FTL access, that time may be only 1.7 µSec, which represents a 15% gain in performance when using speculative pre-fetching. In examples where the FTL table is stored in NAND rather than DRAM, even better results may be achieved when using speculative pre-fetching since NAND access time may be, e.g., 7 µSec and so more than 1 µSec can be hidden.

Note also that, in some embodiments, the initial HW computation procedure may be the same as the full FW computation procedure (i.e. the initial procedure is not a "simplified" procedure). In such an implementation, the FTL always achieves cache hits (since the FTL address computed by FTL FW will be the same address as computed by the initial HW computation procedure, and hence the FTL entry will be cached). Nevertheless, this embodiment may still offer operational benefits since HW makes sure that the relevant entry is cached before the FTL accesses the cache. This can increase overall performance and permit a simplification of the operations that the FTL FW needs to perform. Note further that, although several of the examples herein describe the use of SRAM and DRAM, other memory components, devices, or storage technologies may be used.

These and other features will be discussed in detail in the following sections.

Exemplary Data Storage Controller Systems and Procedures

FIG. 1 illustrates, at a high level, an SSD data storage system 100 configured to control access to an NVM data storage device (such as a NAND) 104 by a host device 102. The data storage system 100 includes a data storage controller 106 configured to perform speculative FTL pre-fetching from a DRAM 108 (or other memory component) that stores FTL tables 110. Various busses are shown interconnecting the main components. Bus 111 couples the host device and the data storage controller 106. Bus 113 couples the data storage controller 106 and the NVM device 104. Bus 115 couples the data storage controller 106 and the DRAM 108.

The data storage controller 106 includes a processing system 112 that includes both HW and FW components. A FTL pre-fetch HW component 114 computes a provisional FTL address for accessing the FTL tables 110 of the DRAM 108 using a simplified computation procedure that omits corner and edge cases in the computation. The processing system 112 then retrieves an entry from the DRAM 108 using the provisional address and stores the entry in a FTL table cache 116 of an SRAM 118 (or other memory component). Concurrently, an FTL fetch FW component 120 of the processing system 112 begins to compute the FTL address for accessing the FTL tables 110 using a full computation procedure, which properly handles all pertinent corner and edge cases, for use in fetching the correct FTL entry.

The full computation procedure performed by the FTL FW 120 may be much slower than the simplified computation performed by the pre-fetch HW 114. Hence, by the time the FTL FW computation is done, the pre-fetch from the DRAM 108 is likely competed, with the pre-fetched entry already cached in the SRAM 118. The processing system 112 then accesses the cache 116 using the FTL address computed by the FTL FW 120 in an attempt to retrieve the corresponding DRAM entry from the SRAM. If there is a cache hit, the entry is fetched from the SRAM 118 and used by the processing system 112 to obtain the physical address of data to be read from the NAND 104. If there is a cache miss, the entry is instead fetched from the DRAM 108. As noted above, in practical systems, when employing speculative pre-fetch, many or most read commands may result in cache hits, and so that latency can be reduced as compared to systems that do not employ speculative pre-fetch.

Figure 2:
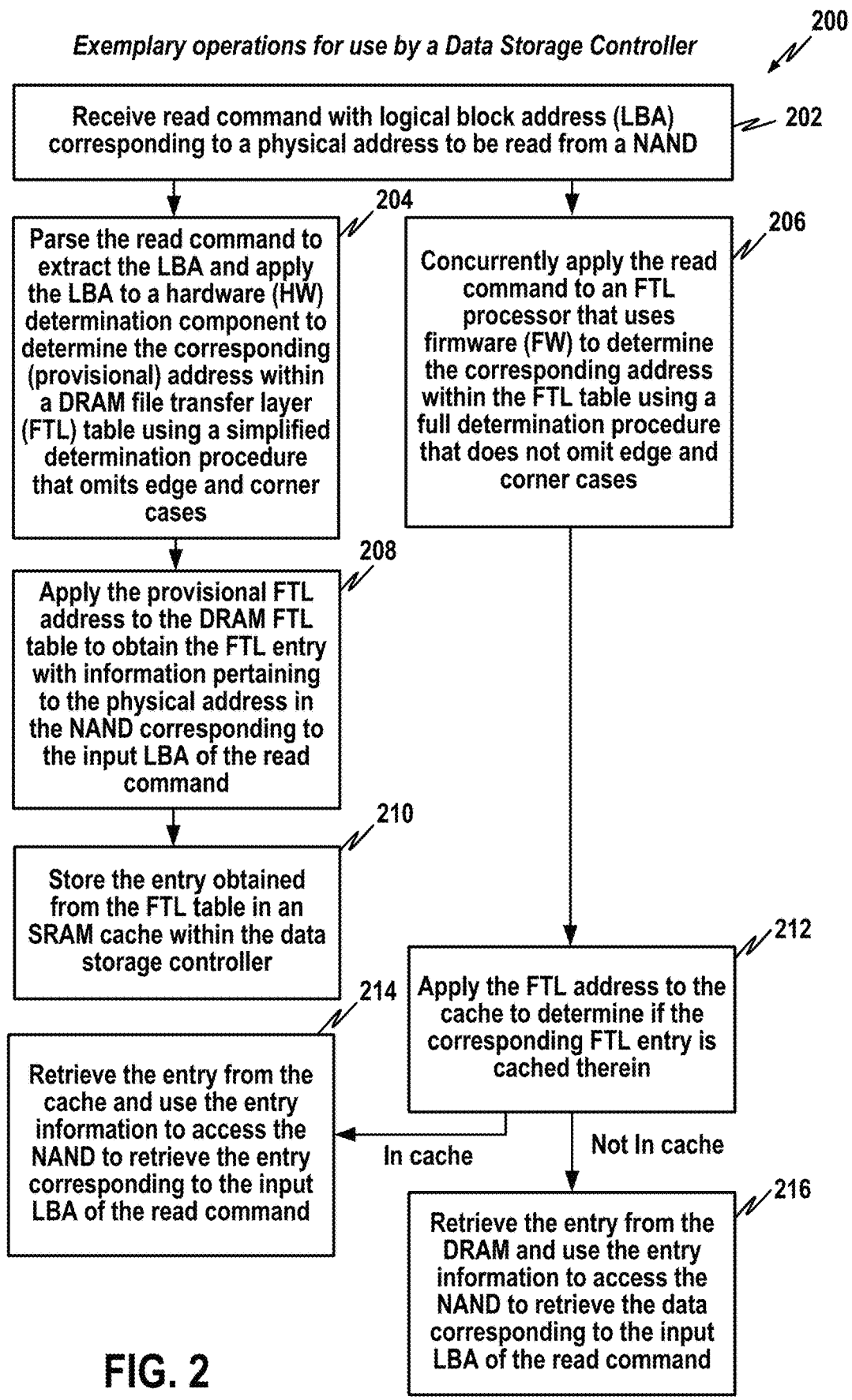
FIG. 2 is a flow chart summarizing the operations of a data storage controller to speculatively pre-fetch FTL table entries.

FIG. 2 illustrates these features within a flow diagram 200. Briefly, at 202, the data storage controller receives a read command with an LBA corresponding to a physical address to be read from a NAND. At 204, the data storage controller parses the read command to extract the LBA and applies the LBA to a HW-based determination component to determine the corresponding address within a DRAM FTL table using a simplified determination procedure that omits edge and corner cases. This initial procedures may be performed, for example, by a front end (FE) HW component of the data storage controller, Concurrently, at 206, the data storage controller applies the read command to an FTL processor (which may be a back end (BE) component) that uses FW to determine the corresponding address within the DRAM FTL table using a full determination procedure that does not omit the edge and corner cases. (As already explained, the determination made using the simplified HW procedure might not be accurate and so the results of the HW procedure and the full FW procedure might differ.)

An example of a HW-based simplified procedure is as follows:
Convert SLBA (a submission host logical address) along with an NSID (a namespace ID) to a flat LBA (FLBA) while using several {SLBA, NSID} zones;
Translate the FLBA to FFLBA by shifting right 3b and combining the upper and lower parts of the FLBA (to obtain 32b FFLBA) using
define FLBA_2_FFLBA(_flba_low_, _flba_high_)
(((_flba_low_)>>FLBAS_IN_FFLBA_SHIFT)|((_flba_high_)<<
(32-FLBAS_IN_FFLBA_SHIFT)))
Then use FFLBA to access the mapping table, which includes a shift right of 13b
A FW-based full conversion procedure can be quite complicated and is not reproduced herein.

At 208, the data storage controller applies the provisional FTL address determined by the HW using the simplified procedure to the DRAM FTL table in an effort to obtain the FTL entry with information pertaining to the physical address in the NAND corresponding to the input LBA of the read command. At 210, the data storage controller stores the entry obtained from the FTL table in an SRAM cache within the data storage controller. At 212, once the FW has determined the FTL address using the full determination procedure, the resulting FTL address (which will be correct) is applied to the cache in SRAM to determine if the entry is cached therein. If so, the data storage controller, at 214, retrieves the entry from the cache and uses the entry information to access the NAND to retrieve the data corresponding to the input LBA. Otherwise, at 216, the data storage controller retrieves the entry from the FTL tables in the DRAM and uses the entry information to access the NAND to retrieve the data corresponding to the input LBA. As noted above, in many cases, the needed FTL table information will be in the cache and hence latency can be reduced by using pre-fetching.

Figure 3:
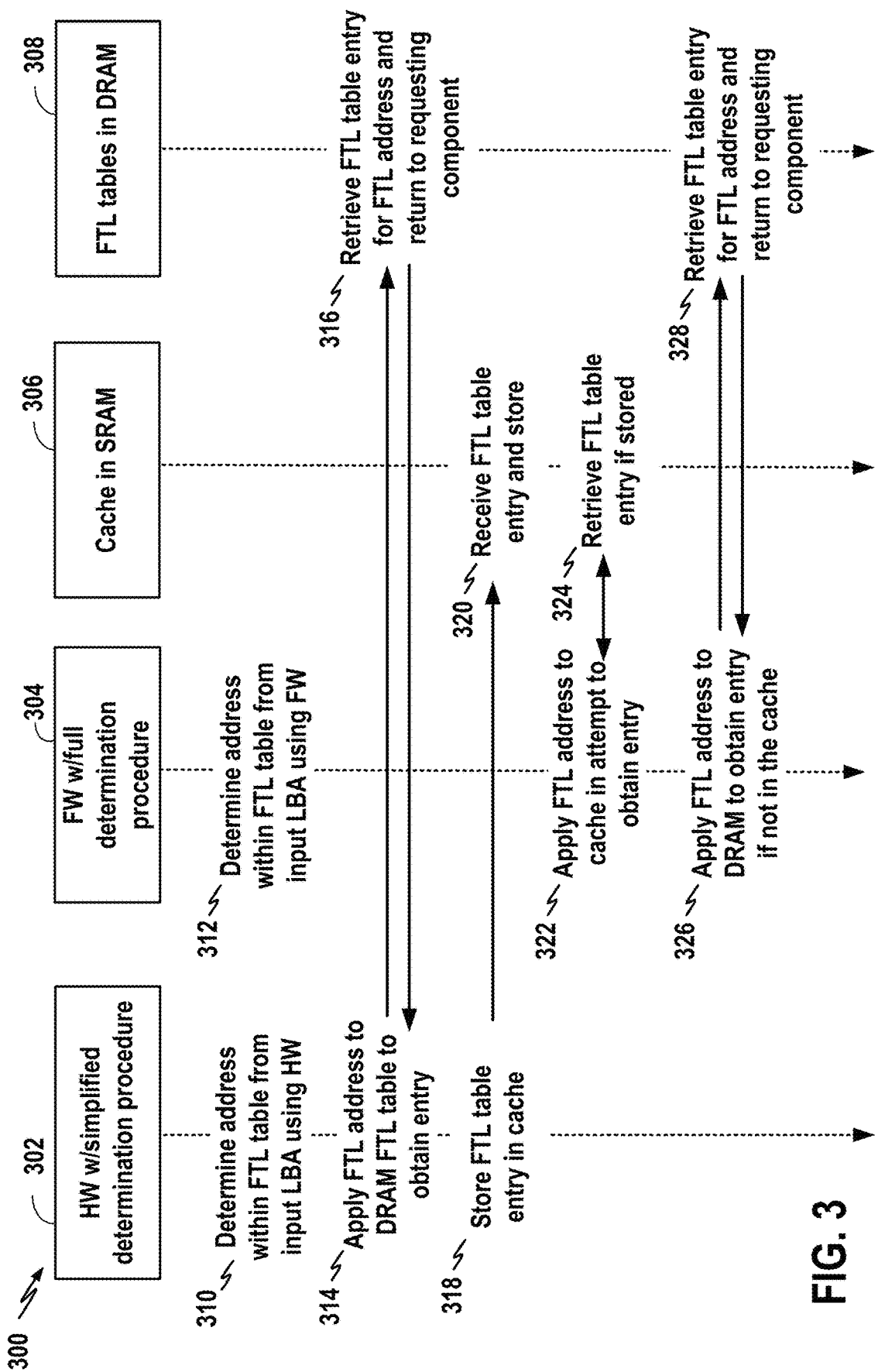
FIG. 3 is a timing diagram summarizing the operations of various components of a data storage controller for use in the speculative pre-fetching of FTL table entries.

FIG. 3 illustrates some of these features within a timing diagram 300, which illustrates the operations of a HW component 302 (configured to implement the simplified determination procedure), a FW component 304 (configured to implement the full determination procedure), a cache 306 in SRAM, and FTL tables 308 in DRAM. Briefly, at 310, the HW component 302 determines the address within the FTL table 308 from an input LBA using the simplified determination procedure. Concurrently, at 310, the FW component begins to determine the corresponding address within the FTL table 308 using the full determination procedure (which is more time consuming). At 314, the HW 302 applies the FTL address it computed to the FTL table 308. At 316, the DRAM containing the FTL table 308 retrieves the requested entry (which, as already explained, might not be correct since it was determined using the simplified formula) and returns it to the requesting component. At 318, the HW 302 sends the received FTL entry to the cache 306 where it is stored, at 320, in SRAM.

At 322, once the FW 304 has determined the FTL address using the full procedure, the resulting FTL address is applied to the cache 306 to determine if the corresponding entry is stored therein. If so, the cache, at 324, retrieves FTL entry, and returns the entry to the FW 304. If, however, the entry is not stored in the cache 306 (because the simplified procedure implemented by the HW 302 did not correctly compute the FTL table address), the FW 304 applies the FTL address, at 326, to the FTL tables 308 in DRAM to obtain the corresponding entry. At 328, the DRAM returns the entry. Following 322 or 326, the FW 304 then uses the FTL table entry to determine the physical address within the NAND that corresponds to the input LBA, so the data at that address can be retrieved (or otherwise accessed).

Figure 4:
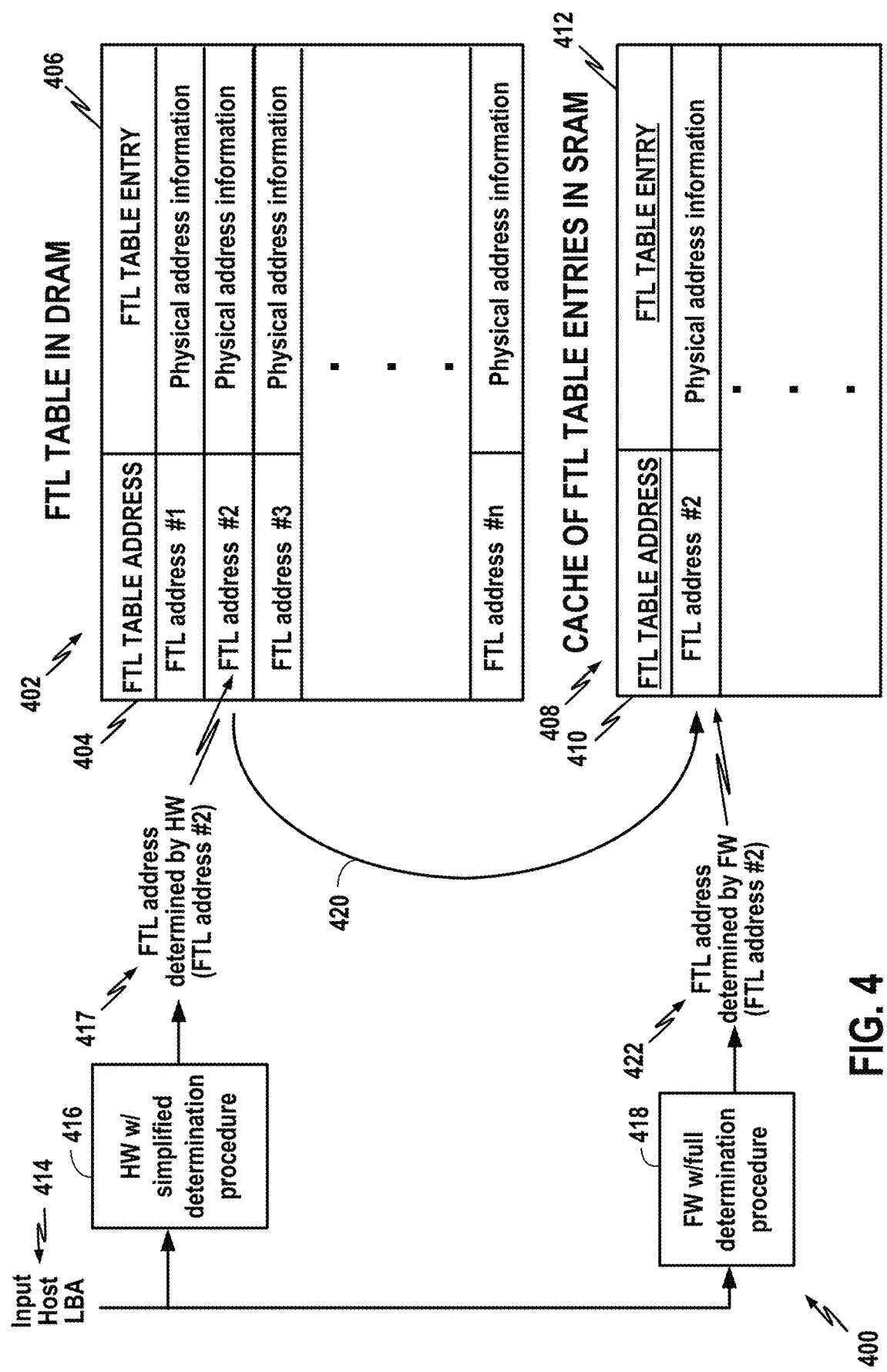
FIG. 4 illustrates an exemplary FTL table and a corresponding FTL cache, and components for speculatively pre-fetching entries from the FTL table for caching in the cache, for an example where there is a cache hit.

FIG. 4 illustrates an exemplary speculative fetch procedure 400 for an example where the HW correctly determines the FTL table address in the DRAM. An FTL table 402 in DRAM is shown, which includes a large number of entries, each of which specifies an FTL table address 406 and provides physical address information corresponding to a particular LBA. A cache 408 of the FTL table in SRAM is also shown, which includes far fewer entries, copied from the DRAM, each of which again specifies an FTL table address 410 and provides physical address information 412 corresponding to a particular LBA. An input host LBA 414 is applied to HW 416 configured to perform the simplified determination procedure to determine the FTL address from the LBA. In this example, the FTL address 417 determined by HW is FTL address #2, and that particular entry is transferred from the FTL table 402 in DRAM to the cache 408 in SRAM, as indicated by arrow 420. Once FW 418 has finished determining the correct FTL address 422 using the full determination procedure, that FTL address is applied to the cache 408. In the example of FIG. 4, the same address is computed (i.e. FTL address #2). That is, the HW 416 correctly identified the FTL address despite using the simplified formula. Since the HW 416 correctly determined the FTL address, the correct entry is stored in the cache 408 and can be promptly accessed from the cache 408 (without again accessing the DRAM FTL table 402, which has a much slower access time).

Figure 5:
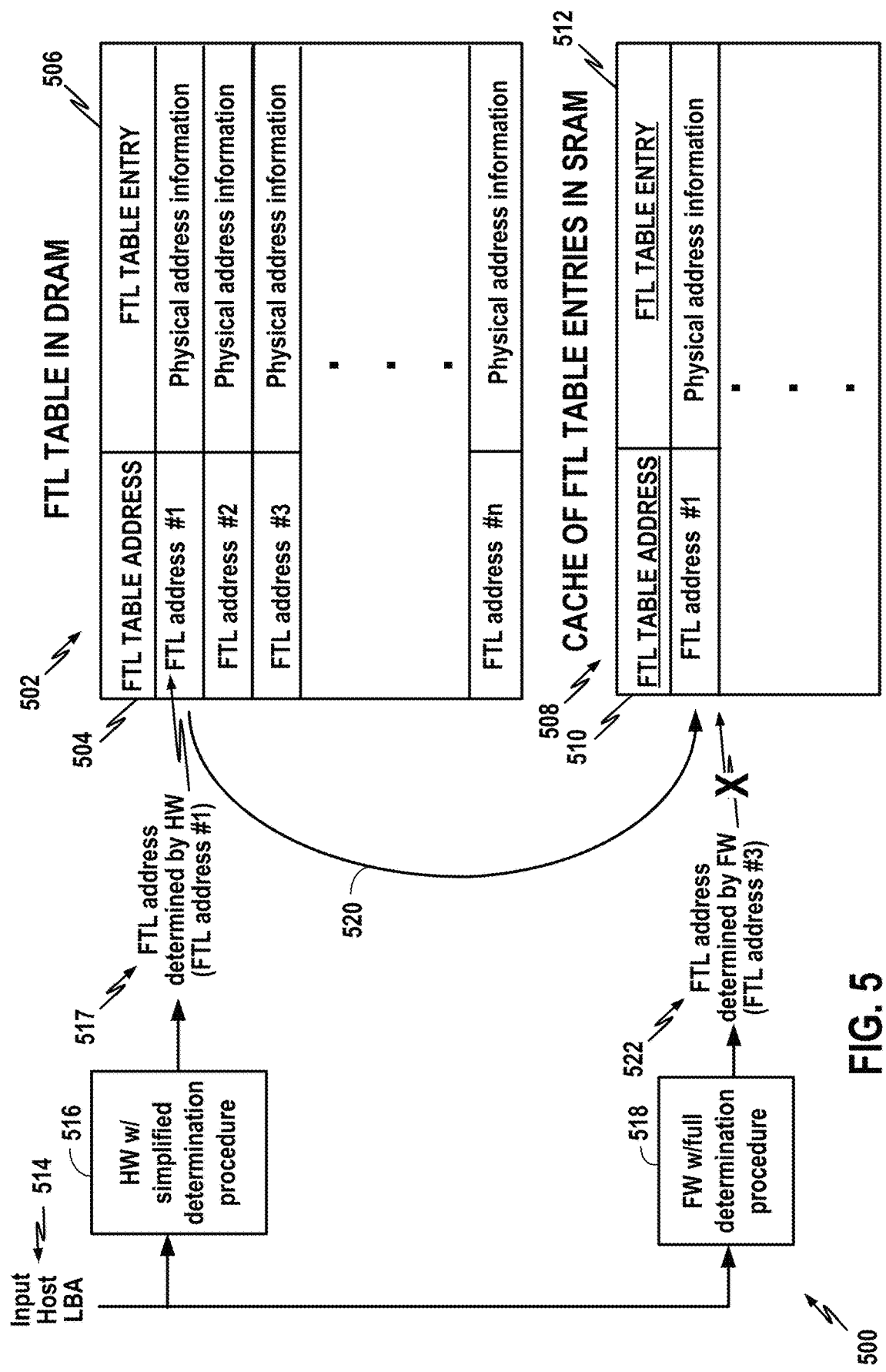
FIG. 5 illustrates an exemplary FTL table and a corresponding FTL cache, and components for speculatively pre-fetching entries from the FTL table for caching in the cache, for an example where there is a cache miss.

FIG. 5 illustrates an exemplary speculative fetch procedure 500 for an example where the HW does not correctly determine the FTL table address in the DRAM. Again, an FTL table 502 in DRAM is shown, which includes entries specifying an FTL table address 506 and provides physical address information corresponding to a particular LBA. The cache 508 of the FTL table in SRAM is also shown, which caches FTL table addresses 510 and the corresponding physical address information 512. An input host LBA 514 is again applied to HW 516 equipped to perform the simplified procedure. In the example of FIG. 5, the FTL address 517 determined by HW is FTL address #1 and the corresponding entry is transferred from the FTL table 502 to the cache 508, as indicated by arrow 520. However, in this example, the FW 518 determines that the correct FTL address 522 is FTL address #3, which is then applied to the cache 508. Since the HW 516 computed a different address (i.e. FTL address #1), there is a cache miss in this case, as denoted by the large block X. As already explained, cache misses are expected to be rare in practical systems for typical NAND access operations.

Additional Exemplary Data Storage Controller Systems and Configurations

Figure 6:
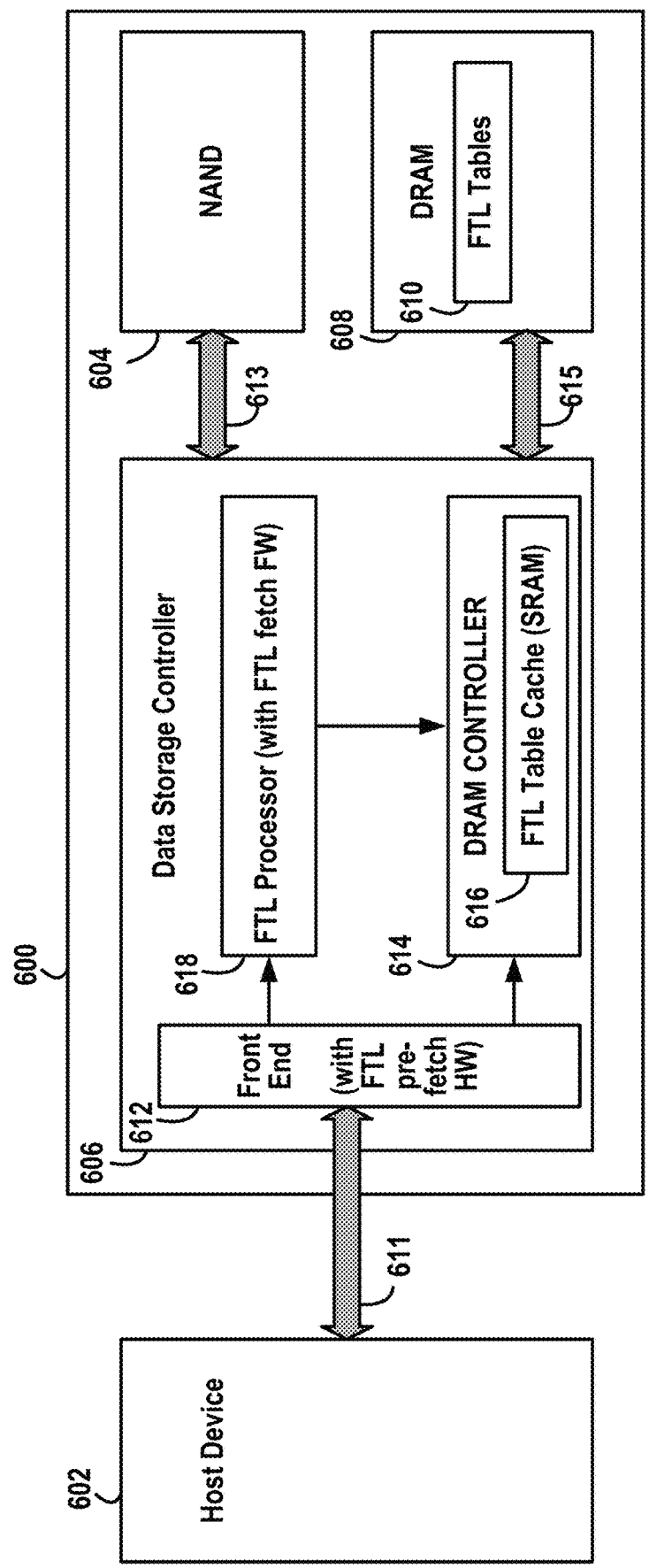
FIG. 6 illustrates another example of a data storage system having a data storage controller and an NVM data storage device (such as a NAND), where the data storage controller is equipped for speculative pre-fetching of FTL table entries from a DRAM.
Figure 7:
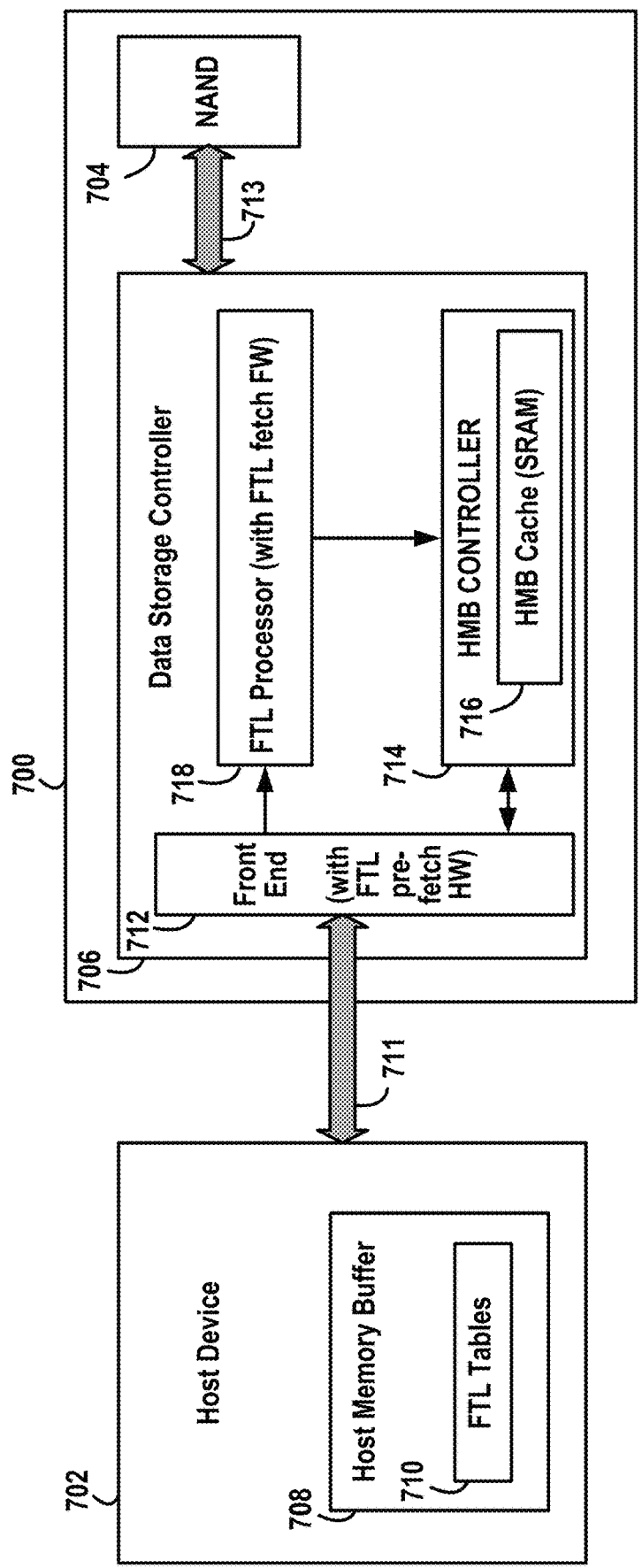
FIG. 7 illustrates another example of a data storage system having a data storage controller and an NVM data storage device, where the data storage controller is equipped for speculative pre-fetching of FTL table entries from a host memory buffer (HMB).
Figure 8:
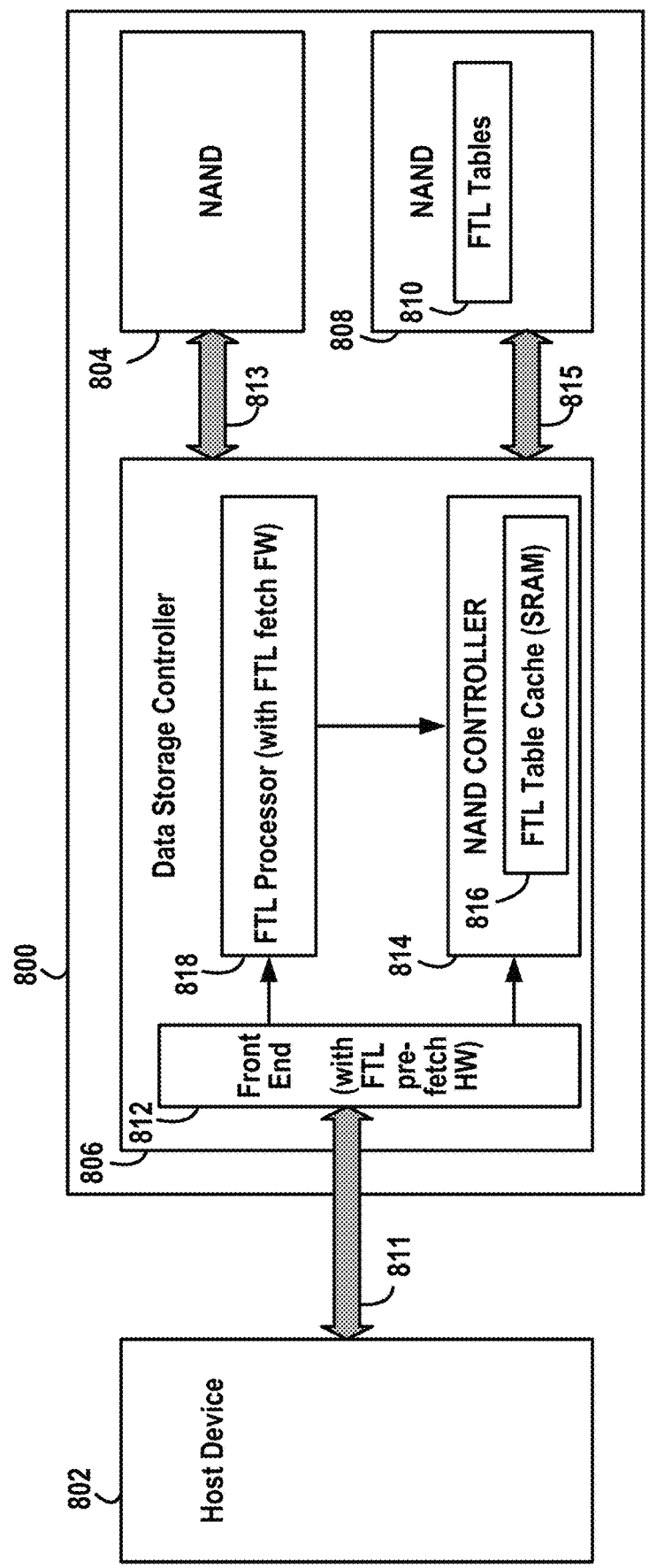
FIG. 8 illustrates another example of a data storage system having a data storage controller and an NVM data storage device, where the data storage controller is equipped for speculative pre-fetching of FTL table entries from a portion of a NAND storage device.

The data storage controller components for use in implementing speculative FTL pre-fetching may be arranged in various configurations, and the FTL tables may be stored in various different locations. FIGS. 6-8 show some particular examples.

FIG. 6 illustrates an SSD data storage system 600 configured to control access to a NAND 604 by a host device 602. The data storage system 600 again includes a data storage controller 606 configured to perform a speculative FTL pre-fetch from a DRAM 608 that stores FTL tables 610. Busses 611, 613 and 615 interconnect the various main components. In this example, the data storage controller 606 includes a front end (FE) 612 that receives host commands (such as a NAND read commands specifying a read LBA) from the host device 602 and is configured to use FTL pre-fetch HW components to provisionally determine the FTL entry address in the FTL table 610 that corresponds to the input host command using a simplified determination procedure, as already discussed. The provisional FTL entry address is forwarded to a DRAM controller 614, which includes an SRAM FTL cache 616. The DRAM controller 614 retrieves the FTL entry that corresponds to the provisional FTL entry address from the FTL tables 610 and stores the entry in the cache 616. As already explained, the entry includes the physical address in the NAND that corresponds to an input LBA or includes information from which the physical address may be calculated.

The FE 612 concurrently forwards the input host command to an FTL processor 618, which is configured with FTL fetch FW to determine the FTL entry address in the FTL table 610 using the full determination procedure, and already described, which properly handles all pertinent corner and edge cases, for use in fetching the correct FTL entry. The FTL processor 618 forwards the FTL address that it has computed to the DRAM controller 614, which accesses the SRAM cache 616 in an attempt to obtain the corresponding FTL entry. If there is a cache miss, the DRAM controller 614 forwards the FTL address received from the FTL processor 618 to the DRAM 608 to obtain the corresponding FTL entry. In either case, processing then continues to obtain the data to be read from the NAND 604 based on the input host command (or to perform whatever other action is specified by the host command) using the physical address information of the FTL table entry corresponding to the input LBA.

FIG. 7 illustrates another SSD data storage system 700 configured to control access to a NAND 704 by a host device 702 but where FTL tables are stored in a host memory buffer (HMB) of the host device 702, rather than in a DRAM as in the previous examples. The data storage system 700 again includes a data storage controller 706 configured to perform a speculative FTL pre-fetch, but the pre-fetch is taken from an HMB 708 that stores FTL tables 710. A bus 711 interconnects the host device 107 and the data storage controller 706. A bus 713 interconnects the data storage controller 706 and the NAND 704. The data storage controller 706 again includes a FE 712 that receives NAND read commands specifying a read LBA (or other host commands) from the host device 702 and is configured to use FTL pre-fetch HW components to provisionally determine the FTL entry address in the FTL table 710 of the HMB 708 that corresponds to the input host command using the simplified determination procedure. The provisional FTL entry address is forwarded to an HMB controller 714, which includes an SRAM cache 716 that caches HMB FTL entries. The HMB controller 714 retrieves the FTL entry that corresponds to the provisional FTL entry address from the FTL tables 710 of the HMB 708 and stores the entry in the cache 716 in SRAM.

The FE 712 concurrently forwards the input host command to an FTL processor 718, which determines the FTL entry address in the FTL table 710 of the HMB 708 using the full determination procedure, for use in fetching the correct FTL entry. The FTL processor 718 forwards the FTL address that it has computed to the HMB controller 714, which accesses the cache 716 of the HMB in an attempt to obtain the corresponding FTL entry. If there is a cache miss, the HMB controller 714 sends the FTL address received from the FTL processor 718 back to the HMB 708 to obtain the corresponding FTL entry. In either case, processing then continues to obtain the data to be read from the NAND 704 based on the input host command (or to perform whatever other action is specified by the host command) using physical address information in the FTL table entry corresponding to the input LBA.

Thus, in some embodiments, especially where DRAM is not implemented in the device, the device controller (e.g. the data storage controller) may use the HMB for storing FTL tables. The HMB controller is responsible for handling and managing all HMB accesses. A cache of the HMB is implemented in SRAM in the HMB controller (or in a separate SRAM). Generally speaking, fetching entries from an FTL in an HMB may have more latency than fetching FTL entries from a DRAM and so the benefits of pre-fetching may be even greater in such systems than in systems that use a DRAM for storing the FTL tables.

FIG. 8 illustrates an SSD data storage system 800 configured to control access to a NAND 804 by a host device 802 but where FTL tables are stored in a second NAND 808, rather than in a DRAM or HMB as in the previous examples. The data storage system 800 again includes a data storage controller 806 configured to perform a speculative FTL pre-fetch, but the pre-fetch is taken from NAND 808 that stores FTL tables 810. A bus 811 interconnects the host device 802 and the data storage controller 806. A bus 813 interconnects the data storage controller 806 and the first NAND 804. A bus 815 interconnects the data storage controller 806 and the second NAND 808. (In some examples, the first NAND 804 and the second NAND 808 are partitions of a single NAND component and, if so, separate busses are not provided.)

The data storage system 800 again includes a data storage controller 806 configured to perform a speculative FTL pre-fetch, but in this example the pre-fetch is from the second NAND 808, which stores FTL tables 810. The data storage controller 806 again includes an FE 812 that receives host commands and is configured to use FTL pre-fetch HW components to provisionally determine the FTL entry address in the FTL table 810. The provisional FTL entry address is forwarded to a NAND controller 814, which includes an FTL cache 816 in SRAM. The NAND controller 814 retrieves the FTL entry that corresponds to the provisional FTL entry address from the FTL tables 810 and stores the entry in the cache 816. As already explained, the entry includes the physical address in the NAND that corresponds to an input LBA or includes information from which the physical address may be calculated.

The FE 812 concurrently forwards the input host command to an FTL processor 818, which is configured with regular FTL fetch FW to determine the FTL entry address in the FTL tables 810 using the full determination procedure, and already described. The FTL processor 818 forwards the FTL address that it has computed to the NAND controller 814, which accesses the SRAM cache 816 in an attempt to obtain the corresponding FTL entry. If there is a cache miss, the NAND controller 814 forwards the FTL address received from the FTL processor 818 to the NAND 808 to obtain the corresponding FTL entry. In either case, processing then continues to obtain the data to be read from the first NAND 804 based on the input host command (or to perform whatever other action is specified by the host command) using the physical address information of the FTL table entry corresponding to the input LBA.

Thus, in some embodiments, the device controller (e.g. the data storage controller) uses a second portion of NAND for storing FTL tables. The NAND controller is responsible for handling and managing accesses to that separate portion of NAND. A cache of the FTL table is implemented in SRAM in the NAND controller (or in a separate SRAM). Fetching entries from an FTL in a NAND may have more latency than fetching FTL entries from a DRAM and so, as with the HMB embodiment discussed above, the benefits of pre-fetching may be even greater in NAND-based FTL systems than in DRAM-based FTL systems.

Additional Exemplary Procedures and Methods

Figure 9:
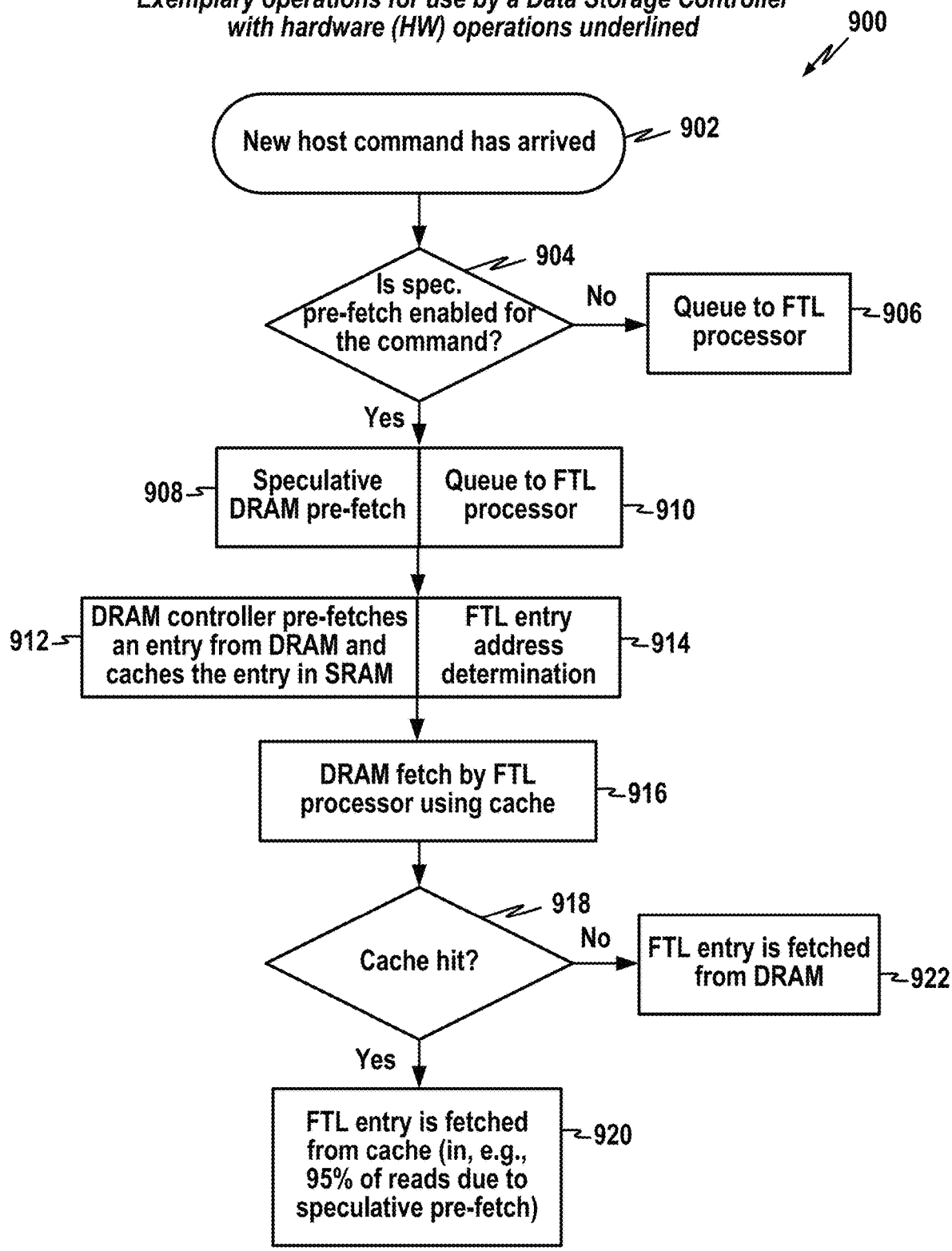
FIG. 9 is a flow chart summarizing selected operations of a data storage controller configured to speculatively pre-fetch FTL entries, and particularly distinguishing operations performed by hardware from those performed by firmware.
Figure 10:
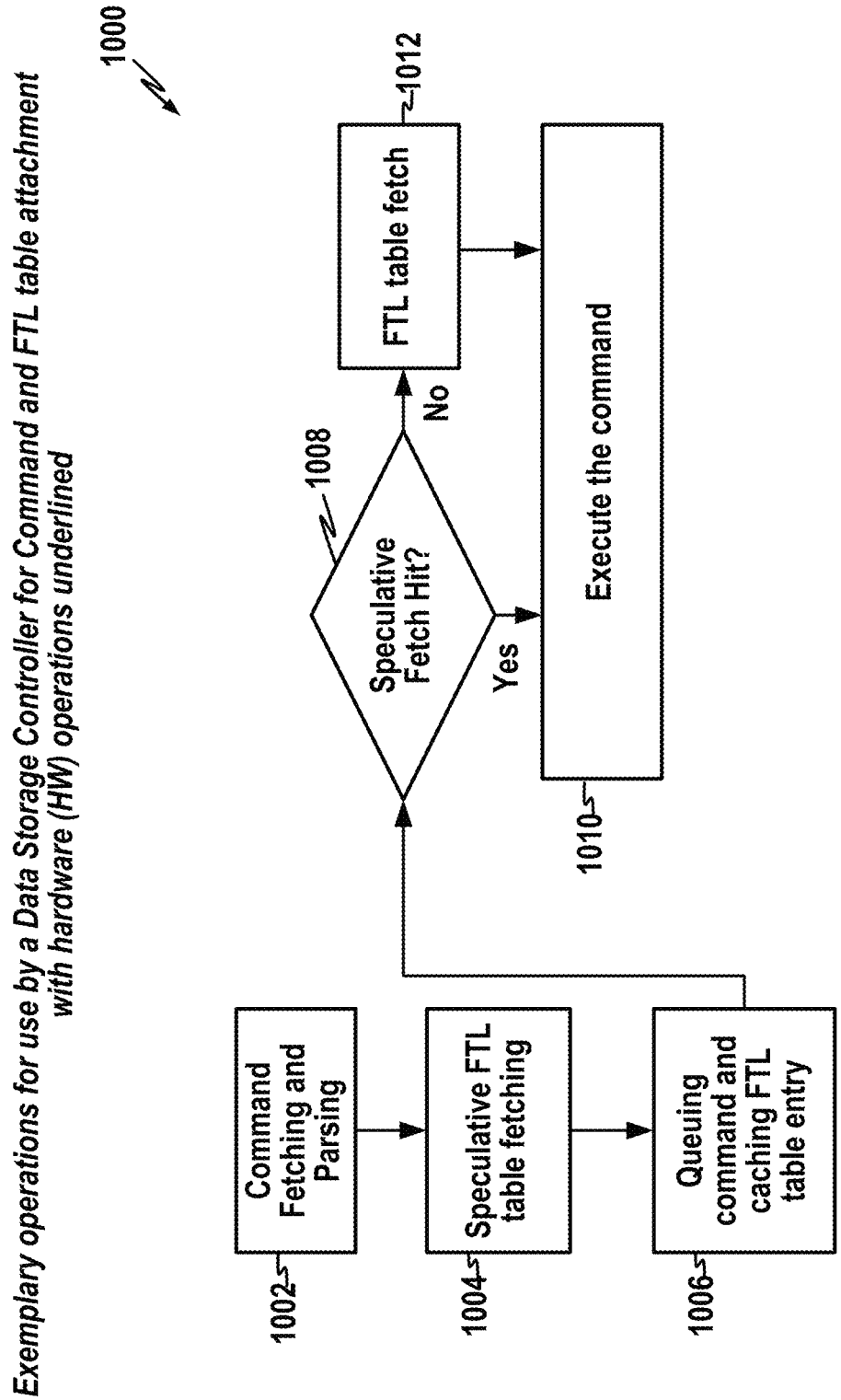
FIG. 10 is another flow chart summarizing several selected operations of a data storage controller configured to speculatively pre-fetch FTL entries, and again particularly distinguishing operations performed by hardware from those performed by firmware.

FIGS. 9-10 illustrate some additional examples of speculative pre-fetch procedures.

FIG. 9 illustrates exemplary speculative pre-fetch procedures within a flow diagram 900. At 902, a new host commands arrives (e.g. the host command is received from the host device or fetched from a submission queue within the host device). At 904, HW of the data storage controller determines if speculative pre-fetch has been enabled for the particular commands. For example, speculative pre-fetch may be enabled for read and write (program) commands but disabled for other commands. If speculative pre-fetch is not enabled for the command, then the command is queued to the FTL processor 906 (which then handles the command without any pre-fetching). If speculative pre-fetch has been enabled for the command, blocks 908 and 910 are initiated concurrently. In block 908, HW performs a DRAM pre-fetch. As already described, this may involve computing a provisional FTL address using a simplified address determination procedure implemented in HW and then applying the provisional FTL address to an FTL table in DRAM (or in an HMB or NAND, as already discussed) to obtain the entry corresponding to the input command (based, for example, on the LBA specified in the command) Concurrently, at 910, the HW queues the command to the FTL processor for FW processing.

Next, at 912, the DRAM controller uses HW components to pre-fetch an FTL entry from the DRAM (or the HMB or NAND, as already discussed) and caches the entry in an SRAM. Concurrently, at 914, FW in the FTL processor compute the FTL address using the full determination procedure that properly accounts for edge and corner situations. Thereafter, at 916, FW of the FTL processor performs a DRAM fetch by first accessing the cache in SRAM to determine if the pre-fetch successfully obtained the correct FTL entry that corresponds to the host command. If there is a cache hit, as determined at 918, the FTL entry is fetched from the cache, at 920. As already explained, a cache hit is expected within practical systems in, for example, 95% of reads due to the speculative pre-fetch). If there is a cache miss, then the FTL entry is fetched from the FTL table in DRAM (or from the HMB or NAND, as already noted).

FIG. 10 summarizes an embodiment where the functional attachment of a command and its corresponding FTL table entry is done by the HW, and the FW receives a notification only when both the command and the FTL table entry are available. That is, in this embodiment, a fetching request with the correct address will be issued to the DRAM controller (or HMB controller, etc.) only when FW FTL detects that the address of the FTL entry is different as what was calculated by the HW.

Briefly, at 1002, HW of the data storage controller fetches or otherwise receives a command (from a host submissions queue or the like) and parses the command to extract the LBA of the command (or other suitable parameter that may be translated into a physical address within the NVM storage component). At 1004, HW then performs the above-described speculative FTL table fetch by, e.g. determining a provisional FTL table address using a simplified procedure and fetching the corresponding entry from the FTL table (in a DRAM, HMB, etc.). At 1006, HW of the data storage controller queues the command to the FTL processor of the data storage controller and caches the pre-fetched entry in the cache in SRAM. In this implementation, the queuing of the command to the FTL processor thus notifies the FTL processor that both the command and the pre-fetched FTL table entry are available.

At 1008, FW of the FTL processor re-determines the FTL entry address using the full determination procedure and applies that address value to the cache to determine if the corresponding physical address information is cached therein. If there is a cache hit, the command is executed, at 1010, using the physical address information from the cached FTL entry to identify the physical location in the NAND where the data is to be stored or read from. If there is a cache miss, the FTL address is applied, at 1012, to the FTL table to fetch the corresponding entry, after which the command is executed, at 1010. Thus, in the example of FIG. 10, the input command and the pre-fetched FTL entry are effectively attached to one another (functionally, if not literally) before the command is queued to the FTL processor.

Exemplary Non-Volatile Memory (NVM) System

Figure 11:
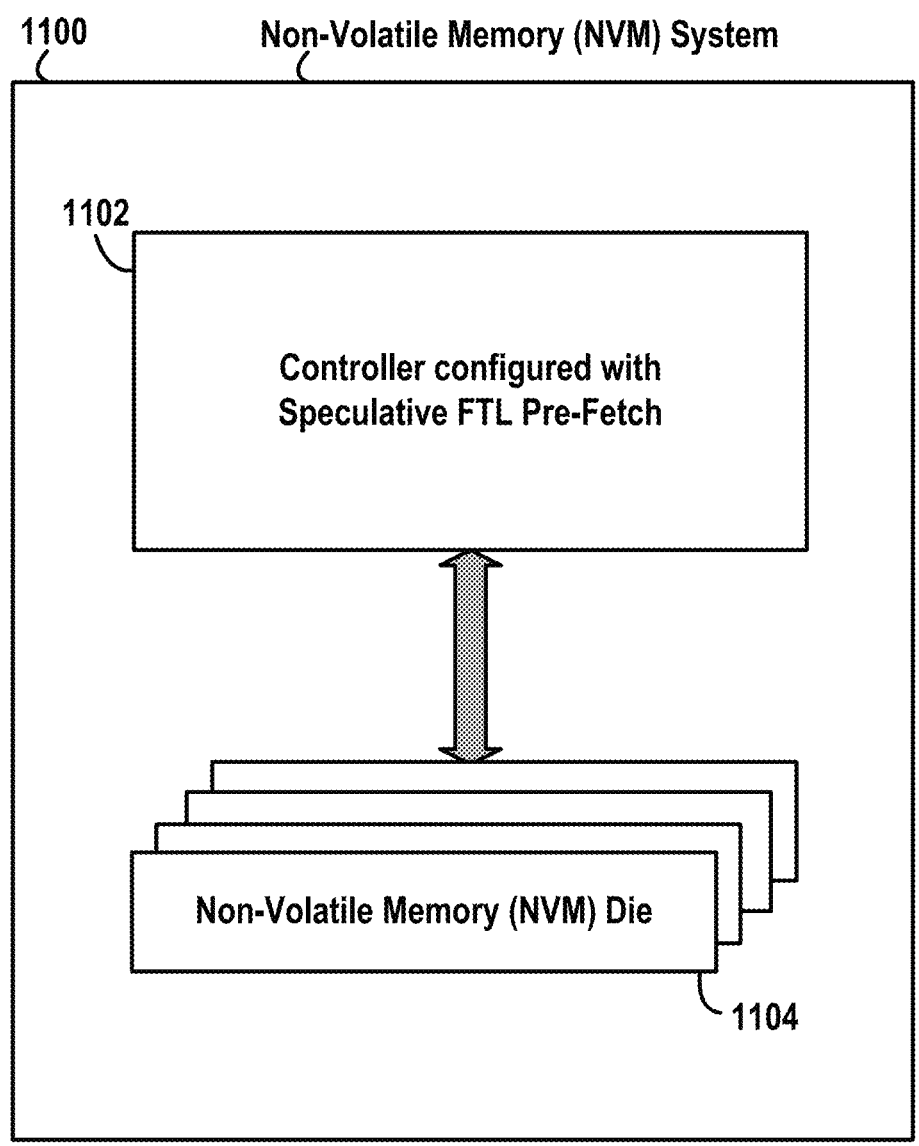
FIG. 11 is a block diagram of an example non-volatile memory (NVM) system having a controller configured for speculative pre-fetching of FTL table entries.
Figure 12:
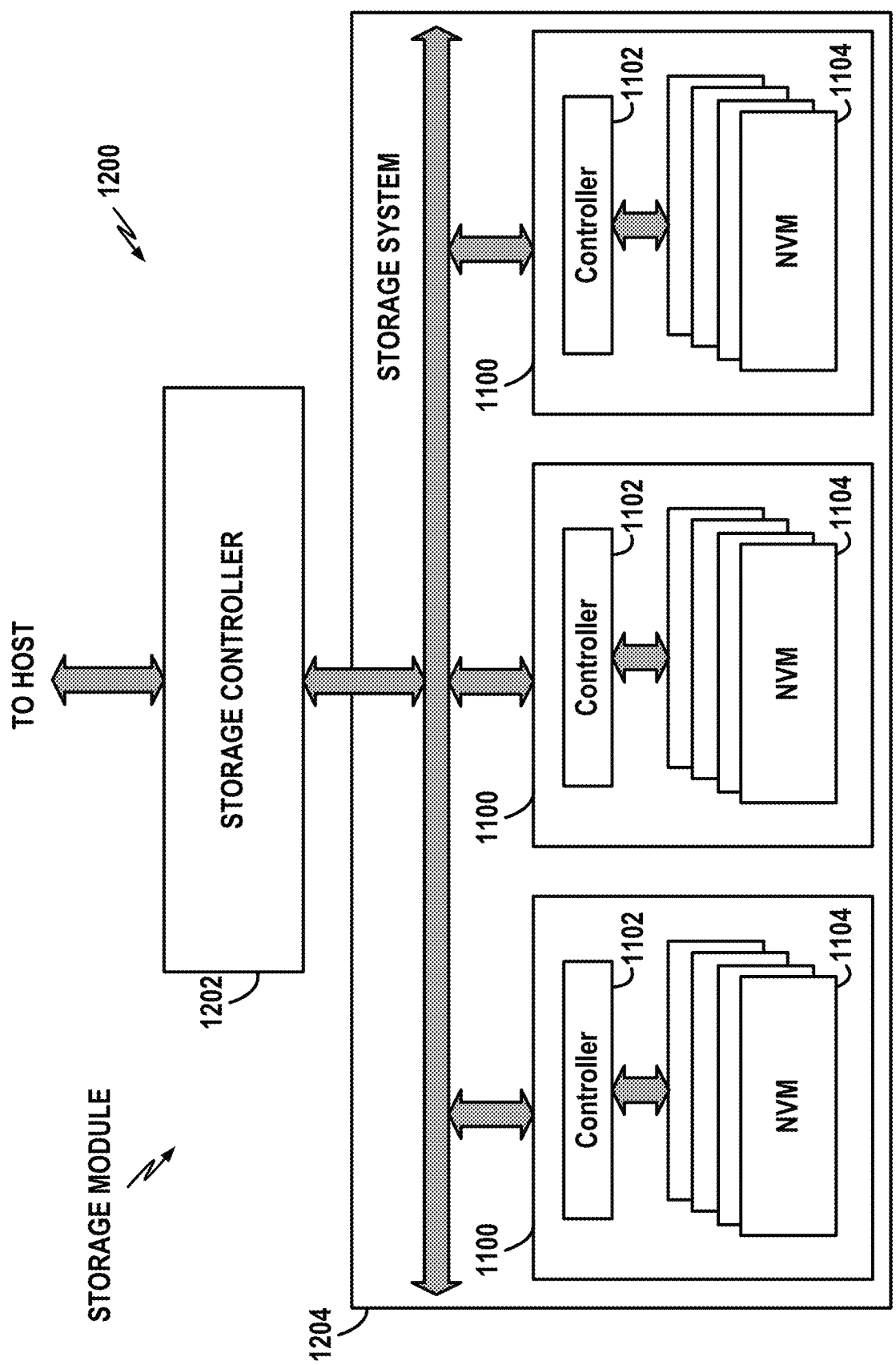
FIG. 12 is a block diagram illustrating an exemplary storage module with multiple NVM systems each having a controller with speculative pre-fetch system, as in FIG. 10.
Figure 13:
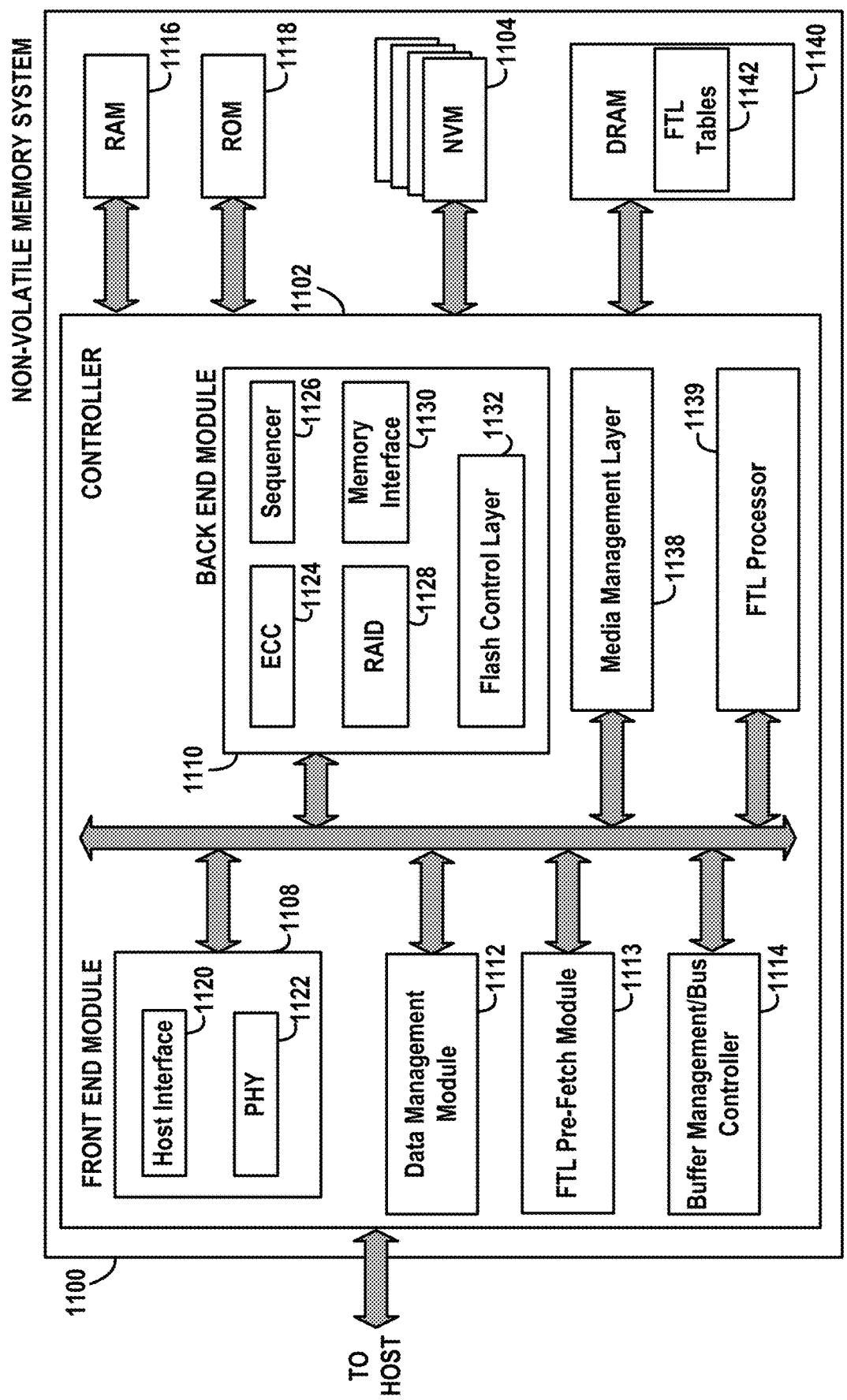
FIG. 13 is a block diagram illustrating exemplary components of the controller of the NVM system of FIG. 10, including an FTL pre-fetch module.

FIGS. 11-13 illustrate and summarize various selected features of an exemplary NVM system employing one or more die managers.

FIG. 11 is a block diagram illustrating an exemplary NVM system 1100 in which the various systems and methods disclosed herein may be used. The NVM system 1100 includes a controller 1102 configured for speculative FTL pre-fetching, and one or more NVM dies 1104. As used herein, the term die may refer to the set of NVM cells, and the associated circuitry for managing the physical operation of the NVM cells, that are formed on a single semiconductor substrate. Controller 1102 interfaces with a host system or device (such as the host device shown in FIG. 1) and transmits command sequences for read, write (program), and erase operations to an NVM die 1104.

The controller 1102 (which may be a flash memory controller) can take the form of processing circuitry, a microprocessor or processor, and/or a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 1102 can be configured with hardware and/or firmware to perform the various functions described herein and shown in the flow diagrams. Also, some of the components shown as being internal to the controller can also be stored external to the controller, and other components can be used. Additionally, the phrase "operatively in communication with" can mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have functionality in addition to the specific functionality described herein. For example, the flash memory controller can format the flash memory to ensure the memory is operating properly, map bad flash memory cells, and allocate spare cells to be substituted for future failed cells. Some portion of the spare cells can be used to hold firmware to operate the flash memory controller and implement other features. In operation, when a host needs to read data from or write data to the flash memory, it communicates with the flash memory controller. If the host provides a logical address to which data is to be read/written, the flash memory controller converts the logical address received from the host to a physical address in the flash memory using the FTL procedures described herein. The flash memory controller can also perform various memory management functions, such as wear leveling (i.e. distributing writes to avoid wearing out specific blocks of memory that would otherwise be repeatedly written to) and garbage collection (i.e. after a block is full, moving only valid pages of data to a new block, so the full block can be erased and reused).

An NVM die 1104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory technologies, now known or later developed. Also, the memory cells can be arranged in a two-dimensional or three-dimensional fashion (as will be discussed further below).

The interface between controller 1102 and NVM die 1104 may be any suitable flash interface, such as a suitable toggle mode. In one embodiment, memory system 1100 may be a card-based system, such as a secure digital (SD) or a micro secure digital (micro-SD) card. In an alternate embodiment, memory system 1100 may be part of an embedded memory system.

Although, in the example illustrated in FIG. 11, NVM system 1100 includes a single channel between controller 1102 and NVM die 1104, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The controller 1102 may be implemented in a single integrated circuit chip and may communicate with different layers of memory in the NVM die 1104 over one or more command channels.

FIG. 12 illustrates a storage module 1200 that includes plural NVM systems 1100. As such, storage module 1200 may include a main storage controller 1202 that interfaces with a host and with a storage system 1204, which includes a plurality of NVM systems 1100. The interface between storage controller 1202 and NVM systems 1100 may be a bus interface, such as a serial advanced technology attachment (SATA) or peripheral component interface express (PCIe) interface. Storage module 1200, in one embodiment, may be a solid state drive (SSD), such as found in portable computing devices, such as laptop computers, and tablet computers.

FIG. 13 is a block diagram illustrating exemplary components of controller 1102 of FIG. 11 in more detail. Controller 1102 includes a front end (FE) module 1108 that interfaces with a host, a back end module 1110 that interfaces with the one or more NVM die 1104, and various other modules that perform functions which will be described below. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. As already explained, in some examples, certain operations may be implemented in hardware (such as the calculation of the provisional FTL table address) to reduce latency, while other operations may be implemented in firmware (such as the calculation of the FTL table address by the FTL processor using a full determination procedure) to allow for dynamic adjustments to the processing components via changes to ROM or the like.

Modules of the controller 1102 may include a data management module 1112 that handles the scheduling of maintenance and host write operations so as to balance the consumption of space with the creation of free space. In embodiments having an NVM with a plurality of NVM dies, each NVM die may be operated asynchronously and independently such that multiple NVM die may concurrently have schedule cycles balancing consumption and creation of free space in each respective NVM die. An FTL pre-fetch module 1113 may be provided, configured in HW, to perform or control the above-described pre-fetch operations. FTL entries may be pre-fetched from a DRAM 1140, which includes FTL tables 1142. A buffer manager/bus controller 1114 manages buffers in RAM 1116 and controls the internal bus arbitration of controller 1102. A read only memory (ROM) 1118 stores system boot code and may include FW instructions for use by, for example, the FTL processor 1139. Although illustrated in FIG. 13 as located separate from the controller 1102, in other embodiments, the RAM 1116, the ROM 1118, and/or the DRAM 1140 may be located within the controller. In yet other embodiments, portions of these components may be located both within the controller 1102 and outside the controller 1102. Further, in some implementations, the controller 1102 and the various memory components may be located on separate semiconductor die.

Front end module 1108 includes a host interface 1120 and a physical layer interface (PHY) 1122 that provide the electrical interface with the host or next level storage controller. The choice of the type of host interface 1120 can depend on the type of memory being used. Examples of host interfaces 1120 include, but are not limited to, SATA, SATA Express, SAS, Fibre Channel, USB, PCIe, and NVMe. The host interface 1120 typically facilitates transfer for data, control signals, and timing signals. Note that, although the FTL pre-fetch module 1113 is shown separately from the front end module 1108 in FIG. 13, the FTL pre-fetch module 1113 (or some portions thereof) may be a component of the front end module 1108.

Back end module 1110 includes an error correction controller (ECC) engine 1124 that encodes the data bytes received from the host, and decodes and error corrects the data bytes read from the NVM. A low level command sequencer 1126 generates command sequences, such as program and erase command sequences, to be transmitted to NVM die 1104. A RAID (Redundant Array of Independent Drives) module 1128 manages generation of RAID parity and recovery of failed data. The RAID parity may be used as an additional level of integrity protection for the data being written into the NVM die 1104. In some cases, the RAID module 1128 may be a part of the ECC engine 1124. A memory interface 1130 provides the command sequences to NVM die 1104 and receives status information from NVM die 1104. In one embodiment, memory interface 1130 may be a double data rate (DDR) interface. A flash control layer 1132 controls the overall operation of back end module 1110.

Additional components of system 1100 illustrated in FIG. 13 include media management layer 1138, which performs wear leveling of memory cells of NVM die 1104, and an FTL processor 1139 that performs the FTL table fetching, described above, to fetch entries in the FTL tables of the DRAM 1140. The cache described above, in which the pre-fetched FTL entries are stored, may be a portion of RAM 1116, or may be a separate SRAM. System 1100 may also include other discrete components, not specifically shown, such as external electrical interfaces, external RAM, resistors, capacitors, or other components that may interface with controller 1102. In alternative embodiments, one or more of the physical layer interface 1122, RAID module 1128, media management layer 1138, and buffer management/bus controller 1114 are not necessarily provided in the controller 1102.

These systems and procedures may be particularly useful within removable data storage devices equipped for PCIe-NVMe, but aspects of the systems and procedures might be exploited in non-removable storage devices as well, and in devices that do not use PCIe-NVMe.

Further Exemplary Methods and Embodiments

FIGS. 14-18 illustrate and summarize various features of exemplary data storage controllers and methods or procedures for use with data storage controllers or other devices.

Figure 14:
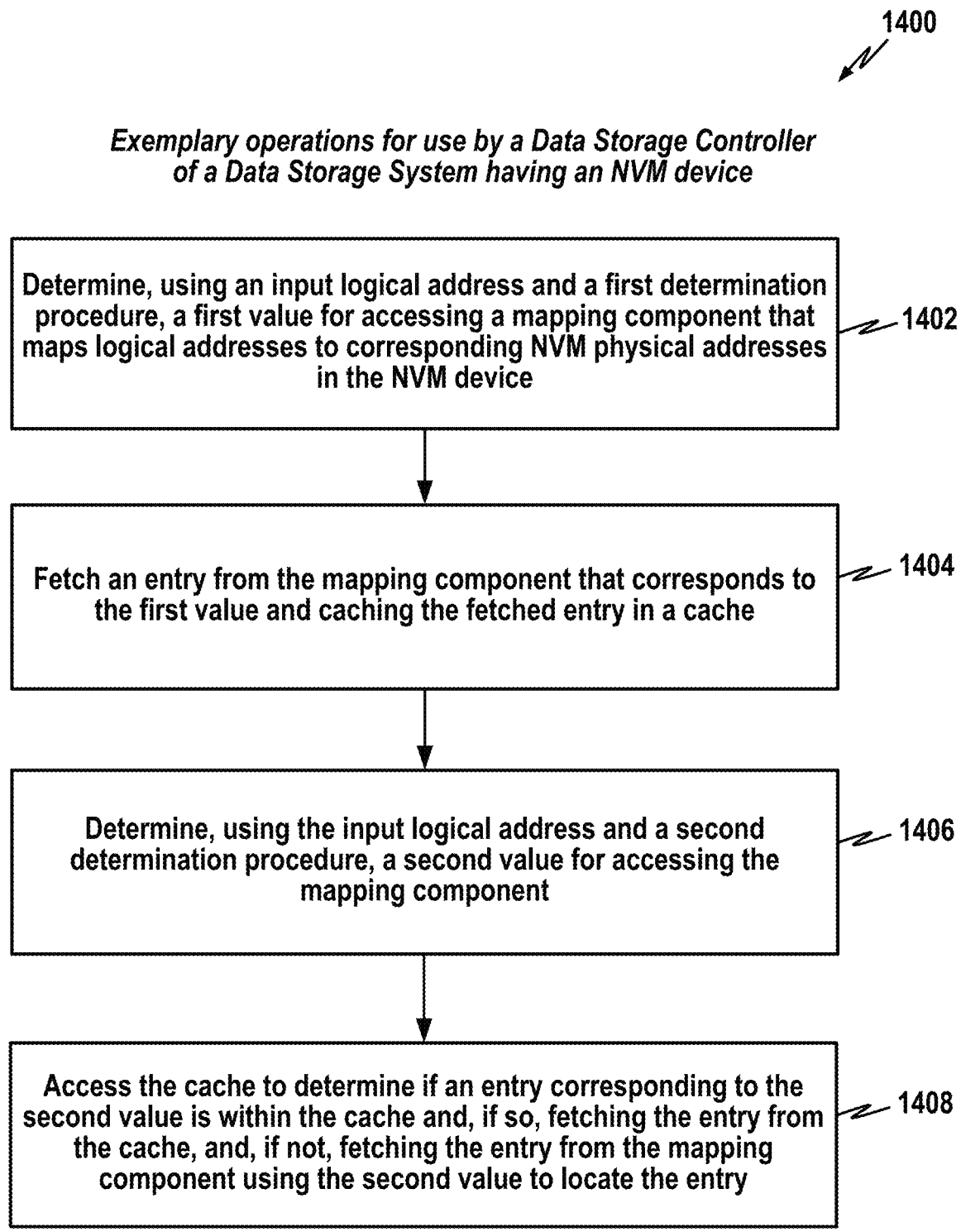
FIG. 14 is a high-level flow chart summarizing selected operations of a data storage controller.

FIG. 14 broadly summarizes exemplary operations 1400 for use by or with a data storage system having a data storage controller or other suitable control device and an NVM storage device, such as a NAND. At 1402, the data storage controller determines, using an input logical address and a first determination procedure, a first value for accessing a mapping component that maps logical addresses to corresponding NVM physical addresses in the NVM device. At 1404, the data storage controller fetches an entry from the mapping component that corresponds to the first value and caching the fetched entry in a cache. At 1406, the data storage controller determines, using the input logical address and a second determination procedure, a second value for accessing the mapping component. At 1408, the data storage controller accesses the cache to determine if an entry corresponding to the second value is within the cache and, if so, fetches the entry from the cache, and, if not, fetching the entry from the mapping component using the second value to locate the entry within the mapping component.

Examples of the methods and procedures of FIG. 14 are described above. In some particular examples, the input logical address is a host LBA, the mapping component is an FTL table maintained in DRAM, the first determination procedure is a simplified HW-based procedure, the first value is a provisional FTL table address, the cache is an SRAM cache, the second determination procedure is full FW-based procedure, the second value is the non-provisional FTL table address, and the NVM device is a NAND storage component.

FIG. 15 further summarizes exemplary operations 1500 for use by or with a data storage system having a data storage controller and NAND. At 1502, the data storage controller inputs a host command such as a read, program (write), or erase command (via, for example, a submission queue) and extracts an LBA from the command that corresponds to a particular NVM physical address. At 1504, using the LBA and a simplified (or non-simplified) HW-based FTL procedure, the data storage controller determines a provisional FTL table address for accessing a DRAM FTL table, where the provisional FTL address specifies a location of an entry within the FTL table that is not necessarily correct and does not necessarily correspond to the particular FTL table entry that maps the input LBA to the corresponding NVM physical address. At 1506, the data storage controller fetches the FTL table entry from the FTL table that corresponds to the provisional FTL table address and caches the fetched entry in an SRAM cache within the data storage controller. At 1508, using the same input host LBA and a full FW-based procedure, the data storage controller determines the correct FTL table address that corresponds to the particular FTL table entry that maps the input logical address to the corresponding NVM physical address, the FW-based procedure that may include one or more processing conditions that the HW-based procedure omits, such as corner and edge cases. At 1510, the data storage controller accesses the SRAM cache (while enforcing cache coherency conditions, discussed above) to determine if the FTL entry corresponding to the correct FTL table address value is within the cache and, if so, fetch the entry from the cache, and, if not, fetch the entry from the DRAM FTL table using the correct FTL address to locate the entry. (As noted above, in some examples the initial HW-based procedure is the same as the full FW-based procedure and so the provisional FTL address determined at 1504 will always be the FTL address determined at 1508, in which case there will always be a cache hit at 1510. And, as noted, in some scenarios, the FTL FW may determine the FTL address before the corresponding entry is cached by HW; hence, the enforcement of cache coherency.) At 1512, the data storage controller determines the physical address within the NVM device that corresponds to the input host LBA from the correct FTL table entry and accesses the NVM device at that physical address to execute the command and read, write (program) or erase data. At 1514, the data storage controller reports completion of the command to the host (via, for example, a completion queue) and forwards any data read from the NVM device.

Figure 16:
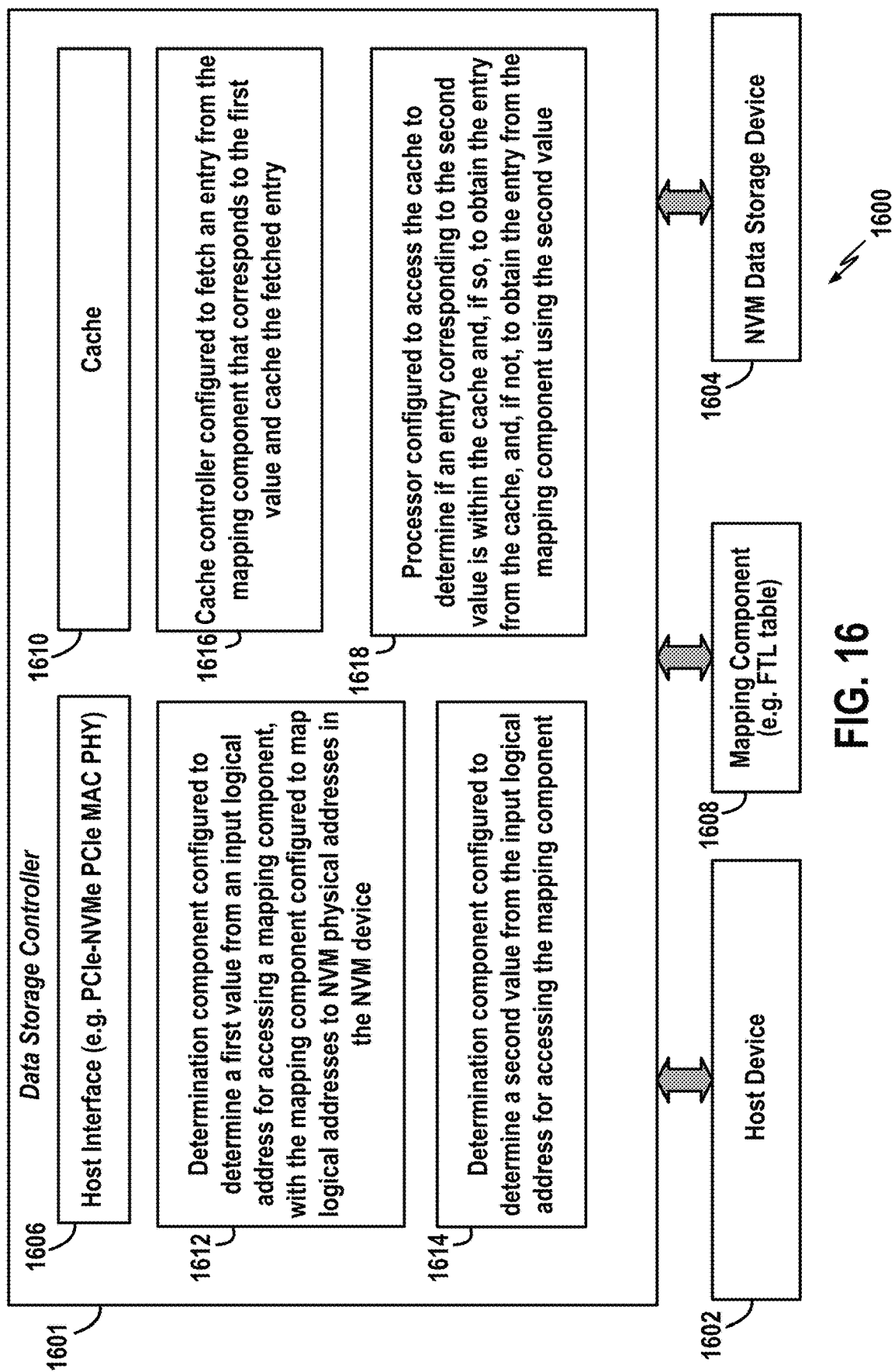
FIG. 16 is a block diagram summarizing selected features of a data storage system having a data storage controller.

FIG. 16 illustrates an exemplary data storage system 1600 having data storage controller 1601 (or memory controller or device controller) configured to communicate with or interface with a host device 1602, a mapping component 1608 (which may include an FTL table), and an NVM data storage device 1604, wherein the data storage controller 1601 may access the data storage device 1604 based on commands issued to the data storage controller 1601 by the host device 1602. Although many examples described herein relate to PCIe-NVMe controllers for storing data within NAND devices, the data storage device 1604 may be any suitable memory or storage device and is not limited to NANDs, and the data storage controller 1601 may be any suitable memory controller device and is not limited to PCIe-NVMe-based controllers.

The exemplary data storage controller 1601 of FIG. 16 includes a host interface 1606 (such as a PCIe-NVMe PCIe MAC PHY interface) and a cache, which may be in SRAM. The data storage controller 1601 also includes a (first) determination component 1612 configured to determine a first value from an input logical address for accessing the mapping component, with the mapping component 1608 configured to map logical addresses to NVM physical addresses in the NVM device 1604. In some examples, the determination component 1612 is configured in HW. A (second) determination component 1614 is configured to determine a second value from the input logical address for accessing the mapping component. In some examples, the (second) determination component 1612 is configured in HW. A cache controller 1616 is configured to fetch an entry from the mapping component 1608 that corresponds to the first value and cache the fetched entry in the cache 1610. A processor 1618, which may be, e.g., an FTL processor, is configured to access the cache to determine if an entry corresponding to the second value is within the cache and, if so, to obtain the entry from the cache, and, if not, to obtain the entry from the mapping component using the second value. Examples of the various components of FIG. 16 are described above.

Figure 17:
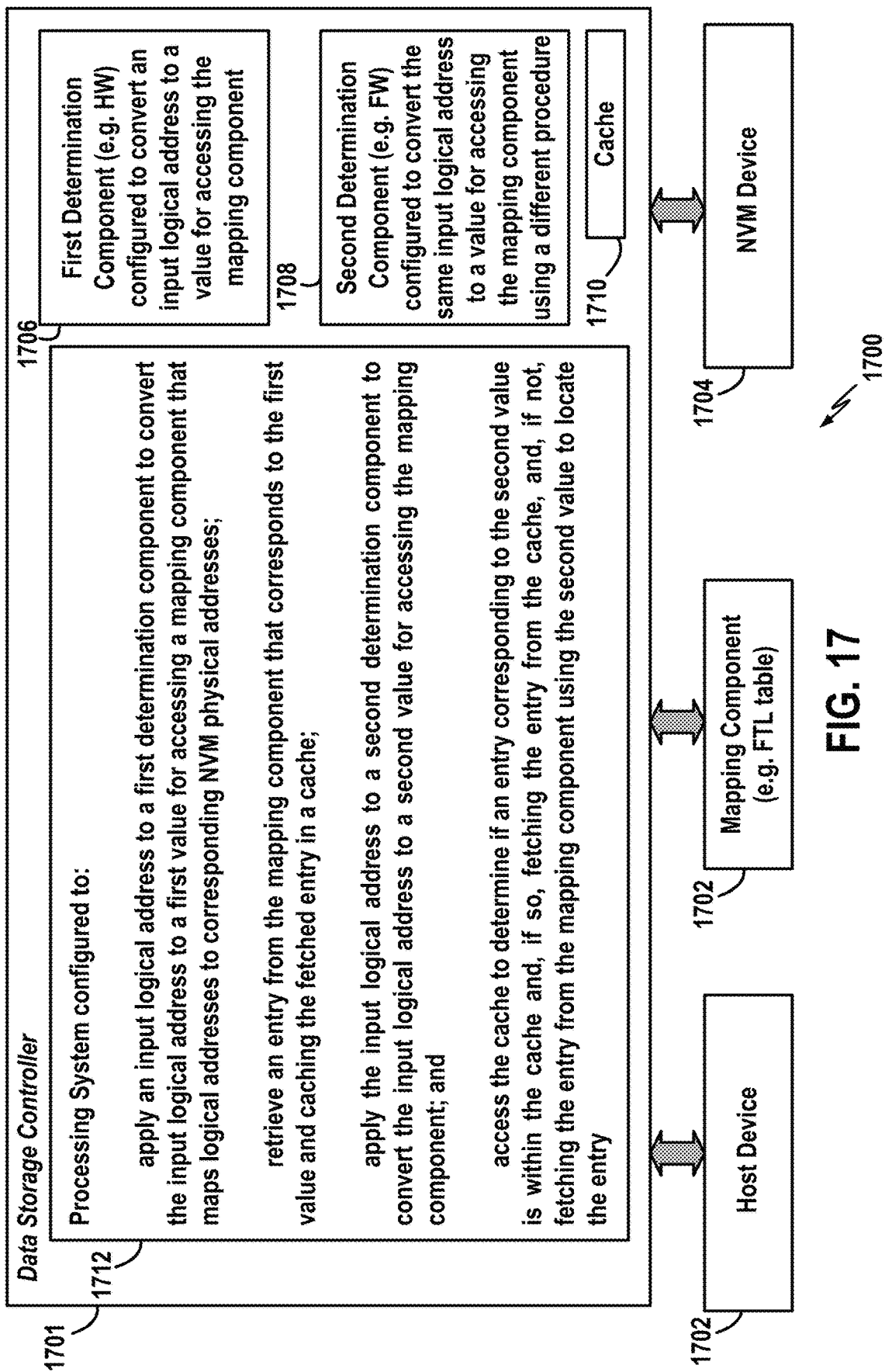
FIG. 17 is another block diagram summarizing selected features of a data storage system having a data storage controller.

FIG. 17 illustrates another an exemplary data storage system 1700 having a data storage controller 1701 (or memory controller or device controller) configured to communicate with or interface with a host device 1702, a mapping component 1708 (which may include an FTL table), and an NVM data storage device 1704. The exemplary data storage controller 1701 of FIG. 17 includes a first determination component 1706, which may be a HW-based component, configured to convert an input logical address from host device 1702 to a value for accessing the mapping component 1702. The data storage controller 1701 also includes a second determination component 1708, which may be a FW-based component, configured to convert the same input logical address to a (possibly different) value for accessing the mapping component using a different procedure. A cache 1710 is also provided, which may be configured in SRAM. The data storage controller also includes a processing system 1712 configured to: (a) apply the input logical address to the first determination component 1706 to convert the input logical address to a first value (such as a first FTL address) for accessing the mapping component 1702 that maps logical addresses to corresponding NVM physical addresses; (b) retrieve an entry from the mapping component 1702 that corresponds to the first value and caching the fetched entry in the cache 1710; (c) apply the same input logical address to the second determination component 1708 to convert the input logical address to the second (and possibly different) value for accessing the mapping component 1702; and (d) access the cache 1710 to determine if an entry corresponding to the second value is within the cache and, if so, fetching the entry from the cache, and, if not, fetching the entry from the mapping component using the second value to locate the entry within the mapping component. Examples of the various components of FIG. 17 are described above.

Figure 18:
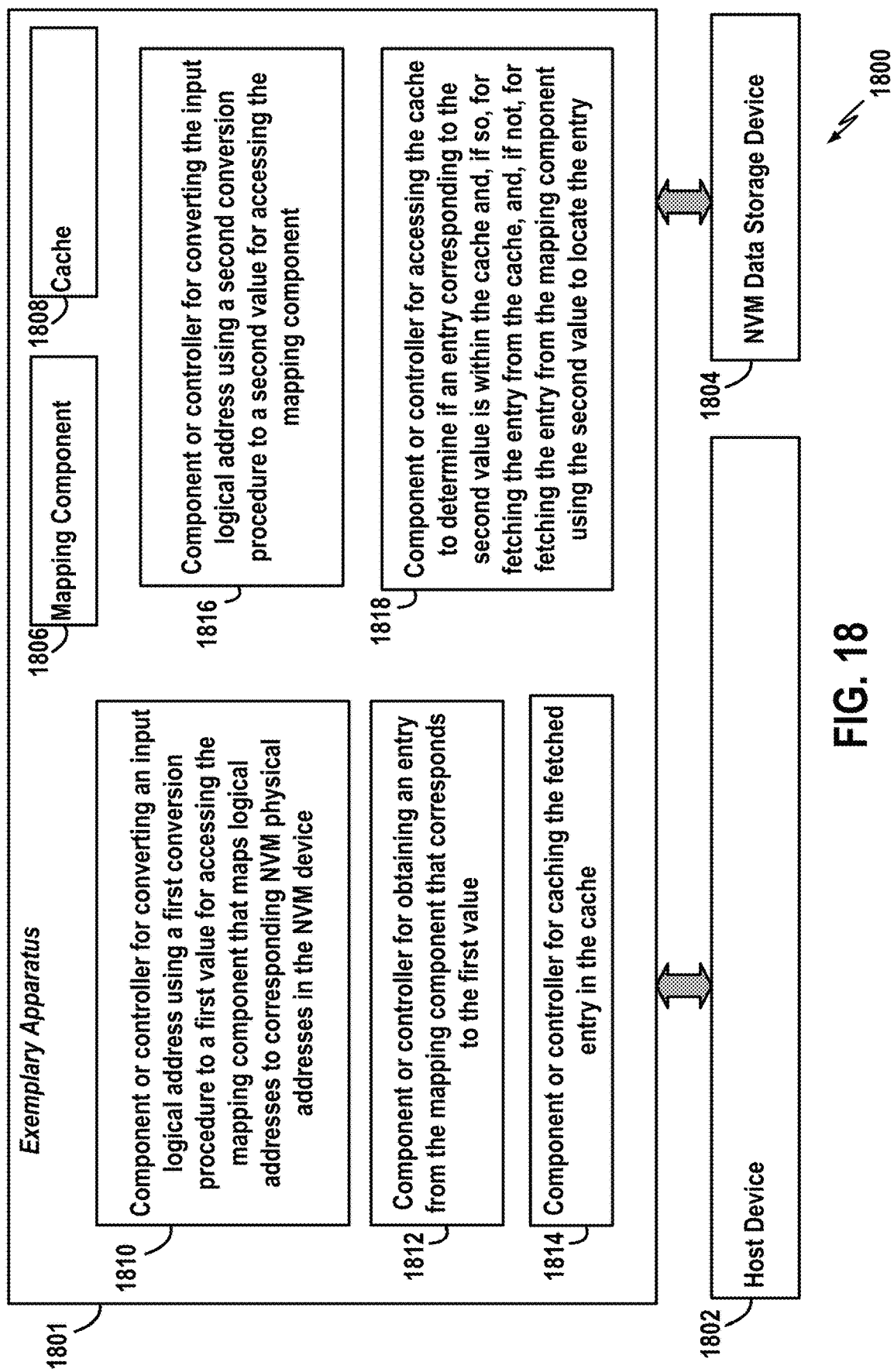
FIG. 18 is a block diagram summarizing selected features of an apparatus.

FIG. 18 illustrates an exemplary data storage system 1800 having an apparatus 1801 for use with a host device 1802 and an NVM data storage device 1804. The apparatus 1801 includes a mapping component 1806 (which may include an FTL table implemented in DRAM) and a cache 1808 (which may be implemented, for example, in SRAM). A component or controller 1810 is provided for converting an input logical address (received, for example, from the host device 1802) using a first conversion procedure to a first value for accessing the mapping component 1806 that maps logical addresses to corresponding NVM physical addresses in the NVM device 1804. A component or controller 1812 is provided for obtaining an entry from the mapping component 1806 that corresponds to the first value. A component or controller 1816 is provided for caching the fetched entry in the cache 1808. A component or controller 1818 is provided for converting the input logical address using a second conversion procedure to a second value for accessing the mapping component 1806. A component or controller 1818 is provided for accessing the cache 1808 to determine if an entry corresponding to the second value is within the cache and, if so, for fetching the entry from the cache, and, if not, for fetching the entry from the mapping component 1806 using the second value to locate the entry within the mapping component. Examples of the various components and controllers of FIG. 18 are described above.

In at least some examples, means may be provided for performing the functions illustrated in FIGS. 14-18 and/or other functions illustrated or described herein. For example, an apparatus (e.g. apparatus 1801) may be provided for use in a data storage system (such as system 1800) that communicates with a host device (e.g. host 1802) and includes an NVM data storage device (e.g. storage device 1804). In some examples, apparatus includes: means (such as component 1810) for converting an input logical address using a first conversion procedure to a first value for accessing a mapping component that maps logical addresses to corresponding NVM physical addresses in the NVM device; means (such as component 1812) for obtaining an entry from the mapping component that corresponds to the first value; means (such as component 1814) for caching the fetched entry in a cache; means (such as component 1816) for converting the input logical address using a second conversion procedure to a second value for accessing the mapping component; and means (such as component 1818) for accessing the cache to determine if an entry corresponding to the second value is within the cache and, if so, for fetching the entry from the cache, and, if not, for fetching the entry from the mapping component using the second value to locate the entry within the mapping component.

In other examples, the apparatus may include: means (such as component 1612 of FIG. 16) for determining, using an input logical address and a first determination procedure, a first value for accessing a mapping component that maps logical addresses to corresponding NVM physical addresses in the NVM device; means (such as component 1616) for fetching an entry from the mapping component that corresponds to the first value and caching the fetched entry in a cache; means (such as component 1614) for determining, using the input logical address and a second determination procedure, a second value for accessing the mapping component; and means (such as component 1618) for accessing the cache to determine if an entry corresponding to the second value is within the cache and, if so, fetching the entry from the cache, and, if not, fetching the entry from the mapping component using the second value to locate the entry within the mapping component.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms. These are just some examples of suitable means for performing or controlling the various functions.

In at least some examples, a machine-readable storage medium may be provided having one or more instructions which when executed by a processing circuit causes the processing circuit to performing the functions illustrated in FIGS. 14-18 and/or other functions illustrated or described herein. For example, instructions may be provided for: determining, using an input logical address and a first determination procedure, a first value for accessing a mapping component that maps logical addresses to corresponding NVM physical addresses in the NVM device; fetching an entry from the mapping component that corresponds to the first value and caching the fetched entry in a cache; determining, using the input logical address and a second determination procedure, a second value for accessing the mapping component; and accessing the cache to determine if an entry corresponding to the second value is within the cache and, if so, fetching the entry from the cache, and, if not, fetching the entry from the mapping component using the second value to locate the entry within the mapping component.

In another example, instructions are provided for: converting an input logical address using a first conversion procedure to a first value for accessing a mapping component that maps logical addresses to corresponding NVM physical addresses in the NVM device; obtaining an entry from the mapping component that corresponds to the first value; caching the fetched entry in a cache; converting the input logical address using a second conversion procedure to a second value for accessing the mapping component; and accessing the cache to determine if an entry corresponding to the second value is within the cache and, if so, for fetching the entry from the cache, and, if not, for fetching the entry from the mapping component using the second value to locate the entry within the mapping component.

The subject matter described herein can be implemented in any suitable NAND flash memory, including 2D or 3D NAND flash memory. Semiconductor memory devices include volatile memory devices, such as DRAM) or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Furthermore, as used herein, a phrase referring to "at least one of" a list of items refers to any combination of those items, including single members. By way of example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Various details of the presently disclosed subject matter may be changed without departing from the scope of the presently disclosed subject matter. Furthermore, the foregoing description is for the purpose of illustration only, and not for the purpose of limitation.

What is claimed is:

1. A data storage system for use with a host device, comprising:
    a non-volatile memory (NVM) device;
    a cache; and
    a data storage controller having a processing system configured to
        apply an input logical address to a first determination component to convert the input logical address to a first value for accessing a mapping component that maps logical addresses to corresponding NVM physical addresses in the NVM device,
        retrieve an entry from the mapping component that corresponds to the first value and caching the retrieved entry in the cache, wherein the retrieved entry is not correct for at least some input logical address values,
        apply the input logical address to a second determination component to convert the input logical address to a second value for accessing the mapping component, wherein second determination component is configured to implement at least some computation procedures omitted from the first determination component, and wherein second value is correct, and
        access the cache to determine if an entry corresponding to the second value is within the cache and, if so, fetching the entry from the cache, and, if not, fetching the entry from the mapping component using the second value to locate the entry within the mapping component.

2. The data storage system of claim 1, wherein the mapping component is a component of one or more of the NVM device, the data storage controller, and the host device.

3. The data storage system of claim 1, wherein the mapping component is a flash translation layer (FTL) table, the first and second values are FTL table addresses configured to specify address locations for entries within the FTL table, and the cache is an FTL cache.

4. The data storage system of claim 1, wherein the first determination component is a hardware (HW) component of the data storage controller and the second determination component is a firmware (FW) component of the data storage controller.

5. The data storage system of claim 1, wherein the mapping component is configured in a first memory, and the cache is configured in a second memory.

6. The data storage system of claim 1, wherein the first determination component is a front end (FE) component of the data storage controller, and wherein the second determination component is a back end (BE) of the data storage controller.

7. The data storage system of claim 1, wherein the NVM device comprises a NAND storage device.

8. A data storage controller for use with a non-volatile memory (NVM) device, comprising:
- a first processor configured to determine a first value from an input logical address for accessing a mapping table, the mapping table configured to map logical addresses to NVM physical addresses in the NVM device;
- a second processor configured to determine a second value from the input logical address for accessing the mapping table, wherein second processor is configured to implement at least some computation procedures omitted from the first processor, and wherein first value determined by the first processor is incorrect for at least some input logical address whereas the second value is correct;
- a cache controller configured to fetch an entry from the mapping table that corresponds to the first value and cache the fetched entry in a cache, wherein the fetched entry is not correct for the at least some input logical address values; and
- a third processor configured to access the cache to determine if an entry corresponding to the second value is within the cache and, if so, to obtain the entry from the cache, and, if not, to obtain the entry from the mapping component using the second value.

9. The data storage controller of claim 8, wherein the mapping table is a flash translation layer (FTL) table, the first and second values are FTL table addresses configured to specify address locations for entries within the FTL table, and the cache is an FTL cache.

10. The data storage system of claim 9, wherein the first processor is configured to provide a first FTL address that does not correspond to a particular FTL table entry in the FTL table that maps the input logical address to the NVM physical address.

11. The data storage system of claim 10, wherein the second processor is configured to provide a second FTL table address that corresponds to the particular FTL table entry that maps the input logical address to the NVM physical address.

12. The data storage controller of claim 8, wherein the first processor is a hardware (HW) processor and the second processor is a firmware (FW) processor.

13. The data storage controller of claim 8, wherein the mapping table is configured in a first memory device, and the cache is configured in a second memory device, the second memory configured to operate faster than the first memory.

14. The data storage controller of claim 13, wherein the first memory device that includes the mapping table is a dynamic random access memory (DRAM), and the second memory device that includes the cache is a static random access memory (SRAM).

15. The data storage controller of claim 14, wherein the first memory device that includes the mapping table is a host memory buffer (HMB) of a host device, and the second memory device that includes the cache is a static random access memory (SRAM).

16. The data storage controller of claim 13, wherein the first memory device that includes the mapping table is a NAND storage component within the NVM device, and the second memory device that includes the cache is a static random access memory (SRAM).

17. The data storage controller of claim 8, wherein the first processor is a front end (FE) processor of the data storage controller, and wherein the second processor is a back end (BE) processor of the data storage controller.

18. The data storage controller of claim 8, wherein the third processor is a flash translation layer (FTL) processor that is separate from the first processor.

19. The data storage controller of claim 8, wherein the NVM device comprises a NAND storage device.

20. A method for use by a data storage system having a data storage controller and a non-volatile memory (NVM) device, comprising:
- determining, using an input logical address and a first determination procedure, a first value for accessing a mapping component that maps logical addresses to corresponding NVM physical addresses in the NVM device;
- fetching an entry from the mapping component that corresponds to the first value and caching the fetched entry in a cache, wherein the fetched entry is not correct for at least some input logical address values;
- determining, using the input logical address and a second determination procedure, a second value for accessing the mapping component, wherein the second determination procedure includes at least some computation procedures omitted by the first determination procedure and wherein the second value is correct; and
- accessing the cache to determine if an entry corresponding to the second value is within the cache and, if so, fetching the entry from the cache, and, if not, fetching the entry from the mapping component using the second value to locate the entry within the mapping component.

21. The method of claim 20, wherein the mapping component is a flash translation layer (FTL) table, the first and second values are FTL table addresses configured to specify address locations for entries within the FTL table, and the cache is an FTL cache.

22. The method of claim 21, wherein the first determination procedure is a provisional determination procedure and the first value is a provisional address to be applied to the FTL table that does not correspond to a particular FTL table entry that maps the input logical address to the NVM physical address.

23. The method of claim 22, wherein the second determination procedure is a full determination procedure and the second value is the FTL table address that corresponds to the particular FTL table entry that maps the input logical address to the NVM physical address.

24. The method of claim 20, wherein the mapping component is stored in a first memory, and the cache is stored in a second memory, the second memory being faster than the first memory.

25. The method of claim 20, wherein fetching the entry from the mapping component and applying the input logical address to a second determination procedure are initiated concurrently.

26. The method of claim 20,
- wherein the input logical address is received from a host device along with a corresponding memory access command directed to the input logical address, and wherein the input logical address is applied to a hardware component to determine the first value, and the corresponding memory access command is applied to a flash translation layer (FTL) processor that is separate from the hardware component to determine the second address.

27. The method of claim 26, wherein the entry is cached before the corresponding memory access command is applied to the FTL processor.

28. An apparatus for use in a data storage system having a non-volatile memory (NVM) device, comprising:
    means for converting an input logical address using a first conversion procedure to a first value for accessing a mapping component that maps logical addresses to corresponding NVM physical addresses in the NVM device;
    means for converting the input logical address using a second conversion procedure to a second value for accessing the mapping component, wherein the means for converting the input logical address using the first conversion procedure employs at least some computational procedures omitted from the means for converting the input logical address using the second conversion procedure, and wherein the first value is incorrect for at least some input logical address whereas the second value is correct;
    means for obtaining an entry from the mapping component that corresponds to the first value;
    means for caching the obtained entry in a cache; and
    means for accessing the cache to determine if an entry corresponding to the second value is within the cache and, if so, for fetching the entry from the cache, and, if not, for fetching the entry from the mapping component using the second value to locate the entry within the mapping component.

29. The apparatus of claim 28, wherein the mapping component is a flash translation layer (FTL) table, the first and second values are FTL table addresses configured to specify address locations for entries within the FTL table, and the cache is an FTL cache.

30. The apparatus of claim 29, wherein the NVM device comprises a NAND storage device.

* * * * *